(12) United States Patent
Parsa et al.

(10) Patent No.: US 8,446,121 B1
(45) Date of Patent: May 21, 2013

(54) HIGH PERFORMANCE ACTUATOR MOTOR

(75) Inventors: Leila Parsa, Green Island, NY (US);
Jeffery M. Roach, Saint Charles, MO (US); Kamiar J. Karimi, Kirkland, WA (US); Shengyi Liu, Sammamish, WA (US); Suman Dwari, Manchester, CT (US)

(73) Assignee: The Boeing Company, Chicago, IL (US)

( * ) Notice: Subject to any disclaimer, the term of this patent is extended or adjusted under 35 U.S.C. 154(b) by 163 days.

(21) Appl. No.: 13/025,033

(22) Filed: Feb. 10, 2011

Related U.S. Application Data

(60) Provisional application No. 61/415,673, filed on Nov. 19, 2010.

(51) Int. Cl.
*H02K 21/14* (2006.01)
(52) U.S. Cl.
USPC .................. 318/538; 310/156.01; 310/156.36
(58) Field of Classification Search
USPC ................... 318/538, 539, 689, 45, 111–113, 318/471–473; 310/156.01, 156.02, 156.08, 310/156.28, 156.29, 156.36
See application file for complete search history.

(56) References Cited

U.S. PATENT DOCUMENTS

| | | | | |
|---|---|---|---|---|
| 4,433,261 A | * | 2/1984 | Nashiki et al. | 310/156.28 |
| 4,618,792 A | * | 10/1986 | Yates | 310/156.55 |
| 5,506,460 A | * | 4/1996 | Steinhart et al. | 310/112 |
| 6,340,857 B2 | * | 1/2002 | Nishiyama et al. | 310/156.53 |
| 6,707,180 B2 | * | 3/2004 | Hattori et al. | 310/61 |
| 7,098,569 B2 | * | 8/2006 | Ong et al. | 310/261.1 |
| 7,228,616 B2 | * | 6/2007 | Stephens | 29/598 |
| 7,816,824 B2 | * | 10/2010 | Jockel | 310/57 |
| 2003/0094873 A1 | * | 5/2003 | Kim et al. | 310/156.43 |

OTHER PUBLICATIONS

Website document entitled, "Adaptable Linear EMA," found at http://www.parkercom by Parker Hannifin Corporation, Control Systems Division, Irvine, California, obtained on Jan. 3, 2011; 2 pages.
Website document entitled, "Rotary Encoders," found at http://www.gpi-encoders.com by Gurley Precision Instruments (GPI), Troy, New York, obtained Jan. 20, 2011; 6 pages.
Website document entitled, "Magnetic Component Engineering," found at http://www.mceproducts.com by Magnetic Component Engineering, Inc. , (2001-2009) obtained Jan. 20, 2011; 1 page.

* cited by examiner

*Primary Examiner* — Bentsu Ro
(74) *Attorney, Agent, or Firm* — Hope Baldauff, LLC

(57) ABSTRACT

An actuator motor described herein has fast dynamic response capability, high torque density, high efficiency, and improved thermal and mechanical stability at high speed while minimizing weight. According to one aspect of the disclosure provided herein, an actuator motor has a rotor shaft with an array of permanent magnets attached according to a Halbach array configuration. A stator includes windings that induce a torque on the rotor shaft when rotating magnetic fields interact with the optimized magnetic flux distributions of the magnets of the Halbach array. According to various embodiments, the rotor shaft is hollow, reducing weight and rotational inertia, while improving ambient cooling characteristics of the motor.

46 Claims, 19 Drawing Sheets

HIGH PERFORMANCE ACTUATOR MOTOR

CROSS REFERENCE TO RELATED APPLICATIONS

This application is a non-provisional application of U.S. Provisional Application Ser. No. 61/415,673 entitled "High Performance Actuator Motor," filed Nov. 19, 2010, which is incorporated herein by reference in its entirety

BACKGROUND

Actuators are commonly used in many industries for all types of applications to move system components in a desirable manner. Depending on the particular implementation, any number and type of actuators may be used. Some applications, such as actuation in aircraft flight control systems, require a motor drive having high acceleration and high holding torque properties. These characteristics, however, provide a difficult hurdle given that the desire for high acceleration characteristics results in a motor utilizing a low inertia rotor, which in turn hinders torque production. To deal with this issue, conventional solutions rely on a heavier motor with a higher power rating, sized to satisfy the required acceleration and torque parameters. However, in the aircraft industry, the size and weight of all aircraft system components are a primary concern.

Permanent magnet motors can be beneficial for use for actuation applications. With conventional permanent magnet motors, a permanent magnet array may be secured to a rotor shaft and allowed to rotate within the magnetic fields produced by surrounding stator windings. The appropriate manipulation of the current through the stator windings produces the desired forces on the permanent magnet array, creating corresponding rotation of the rotor shaft. The permanent magnet array is commonly arranged with the magnetic poles of the permanent magnets having a radial magnetic flux configuration with respect to the rotor shaft. The rotor shaft is typically manufactured as a solid piece of magnetic material, or back iron, that accommodates the magnetic flux from the permanent magnets mounted around the shaft.

One problem with this type of conventional configuration relates to the magnetic flux penetrating the rotor shaft, and the corresponding back iron. During operation of the motor, the high-speed rotation of the rotor creates substantial eddy currents. Because of the large quantity of magnetic flux penetrating the back iron and the corresponding eddy currents during operation, the rotor shaft experiences significant heating, which could result in premature failure and could require additional cooling systems depending on the application. Additional cooling systems increase the cost and weight of the system, as well as adding to the complexity of the overall motor system and the corresponding maintenance requirements.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

The concepts and technologies described herein provide a high performance actuator motor that utilizes a rotor having an optimized permanent magnet array in conjunction with one or more stators to provide an electric motor with improved performance characteristics. Utilizing the concepts described herein, an actuator motor has a rotor with a number of permanent magnets attached around a circumference of a rotor shaft according to an optimized array. The optimized array produces a number of magnetic fields with augmented flux densities on the exterior of the rotor and diminished flux densities within the interior of the rotor. A stator includes a core sized to receive the rotor and a number of windings. The stator windings receive electrical current to create magnetic fields that rotate within the motor, interacting with the magnetic fields from the optimized array of rotor magnets and inducing a torque on the rotor shaft.

According to another aspect of the disclosure provided herein, a high performance actuator motor system includes a power source, an actuator controller, an actuating device, and an actuator motor. The actuator controller is communicatively linked to the power source and controls the electrical input from the power source to the actuator motor. The actuator motor includes two motors on a common rotor shaft, each motor having a rotor and a stator. The two motors can each independently drive the actuating device or they can collectively drive the actuating device.

Each motor has a rotor with a number of permanent magnets attached around a rotor shaft. The magnets are arranged according to an optimized array that produces a number of magnetic fields with augmented flux densities on the exterior of the rotor and diminished flux densities within the interior of the rotor. Each stator includes a core sized to receive the corresponding rotor and a number of windings. The stator windings receive electrical current to create magnetic fields that rotate within the motor, interacting with the magnetic fields from the optimized array of rotor magnets and inducing a torque on the rotor shaft.

According to yet another aspect, a method of driving an actuating device includes attaching a number of magnets to an outer surface of a hollow rotor shaft. The magnets are arranged according to an optimized array that produces a plurality of rotor magnetic fields having augmented flux densities exterior to the rotor shaft and diminished flux densities within an interior of the rotor shaft. A number of parallel strands of conductor are wrapped around a number of stator teeth of a stator to create three pairs of stator windings configured to alternately receive three phases of electrical current. The rotor shaft is positioned with the magnets within the stator a gap width from the stator teeth in the center of the three pairs of stator windings. The actuating device is mechanically connected to the rotor shaft and three-phase current is input to the three pairs of stator windings to create a rotating magnetic field that creates a torque on the rotor shaft to drive the actuating device.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1A:
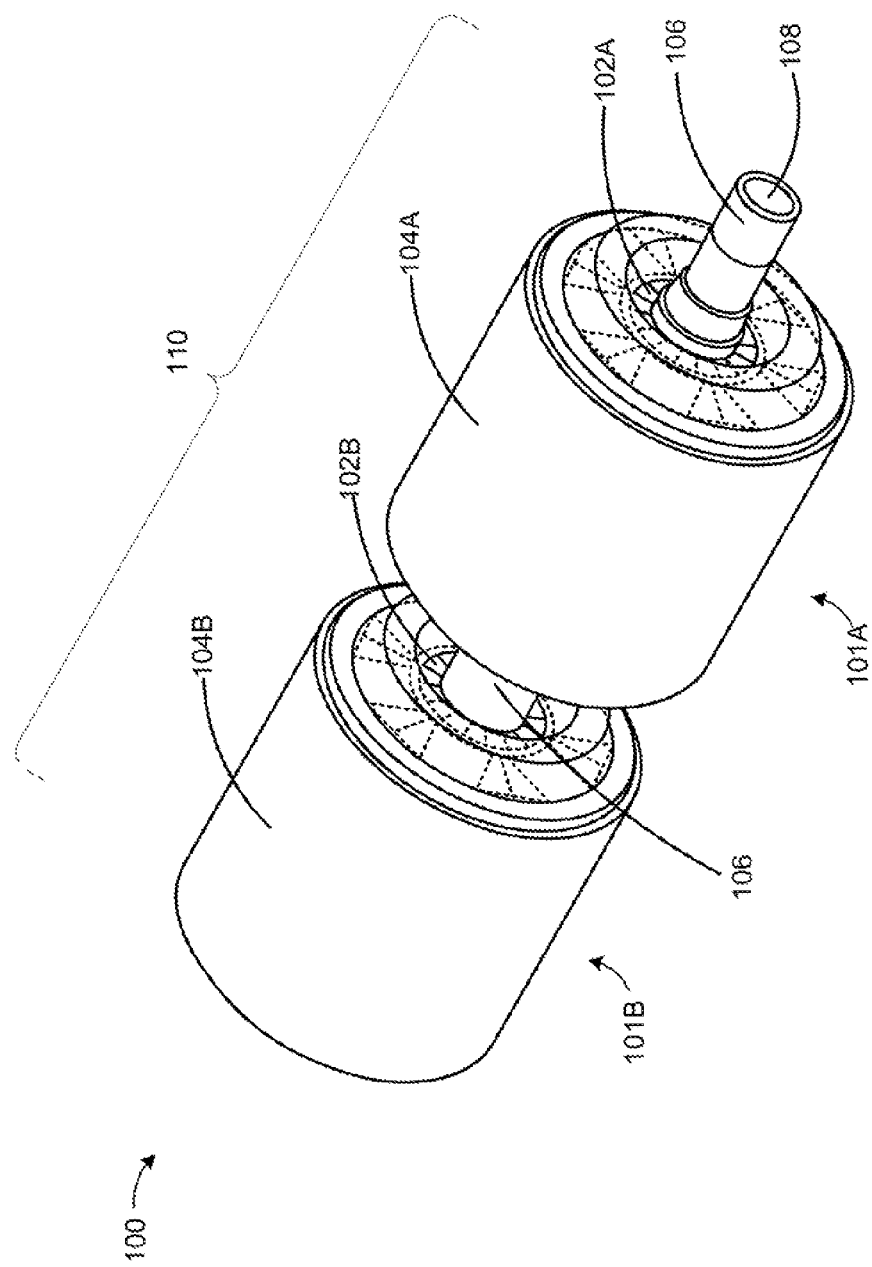
FIG. 1A is a perspective view of a high performance actuator motor utilizing a dual motor configuration according to various embodiments described herein.

The following detailed description is directed to systems and methods for providing an enhanced actuator motor. As discussed briefly above, conventional electric motors utilize various combinations of permanent magnets and electromagnets with the rotors and stators of motors. The use of permanent magnets with a rotor of an electric motor provides benefits over the use of rotor windings, including an increase in efficiency and reliability. However, when permanent magnets are placed around the circumference of a rotor shaft in a radial configuration with north/south poles aligned with a radial axis of the rotor shaft, the magnetic flux fields penetrate the rotor shaft. To facilitate the transmission of the flux through the rotor shaft, the shaft is commonly manufactured from a solid piece of ferromagnetic material, such as iron.

The solid iron rotor shaft of a conventional permanent magnet motor creates several problems, the first of which is weight. In many applications, particularly those in the aerospace industry, weight is a significant consideration in the design and manufacturing of motor systems. Moreover, due to the magnetic flux passing through a solid rotor shaft at high speeds, eddy currents cause the shaft to substantially heat up. The heat may contribute to premature failure of any number of motor components. Dissipating this heat or otherwise cooling the motor system using additional cooling systems and techniques creates additional cost, weight, and opportunity for mechanical failure. Additionally, the increase in weight associated with a solid ferromagnetic rotor shaft decreases the potential acceleration of the shaft due to the high inertial properties of the solid shaft.

While traditional permanent magnet motors can be utilized as effective tools for actuation applications, the various shortcomings of these motors discussed above are detriments to widespread use in aerospace implementations. However, utilizing the concepts and technologies described herein, a high performance actuator motor overcomes these issues utilizing optimized rotor and stator configurations. As will be described in detail below, various embodiments utilize a rotor having an optimized array of permanent magnets arranged around the rotor shaft such that associated magnetic fields do not penetrate, or only minimally penetrate, the rotor shaft.

Because the magnetic field distribution is almost entirely external to the rotor shaft, the rotor shaft does not need to include substantially large quantities of back iron. Accordingly, various embodiments described below utilize a hollowed rotor shaft. The hollow shaft is substantially lighter than a conventional rotor shaft, which is beneficial to an aerospace application of the actuator motor. The hollow core of the rotor shaft also decreases the rotational inertia of the rotor, which substantially increases the acceleration and specific power of the rotor. By creating external magnetic flux fields that do not penetrate the rotor shaft, excessive heating of the shaft does not become a problem. Additionally, because the shaft is hollow, cooling air may be directed through the rotor shaft to cool the motor.

In the following detailed description, references are made to the accompanying drawings that form a part hereof, and which are shown by way of illustration, specific embodiments, or examples. Referring now to the drawings, in which like numerals represent like elements through the several figures, a high performance actuator motor and corresponding actuation method will be described. FIG. 1A shows an actuator motor 100 according to various embodiments disclosed herein. According to this embodiment, the actuator motor 100 is designed according to a dual actuator motor configuration 110, which includes two motors, 101A and 101B (a single motor will be generically referred to as "motor 101"), installed on a common rotor shaft 106. The motor 101A includes a rotor, or rotor 102A (one or more rotors will be generically referred to as "rotor 102") attached to the rotor shaft 106 and rotatable within a stator 104A (one or more stators will generically be referred to as "stator 104"). Similarly, the motor 101B includes a rotor 102B attached to the rotor shaft 106 and positioned within a stator 104B.

The various aspects and configurations of an actuator motor 100 will first be described generally for clarity purposes in order to describe the concepts and technologies encompassed by this disclosure. Specific details of the components of an actuator motor 100, as well as some corresponding sample performance calculations according to various embodiments, will be provided below beginning with FIG. 13A.

Figure 1B:
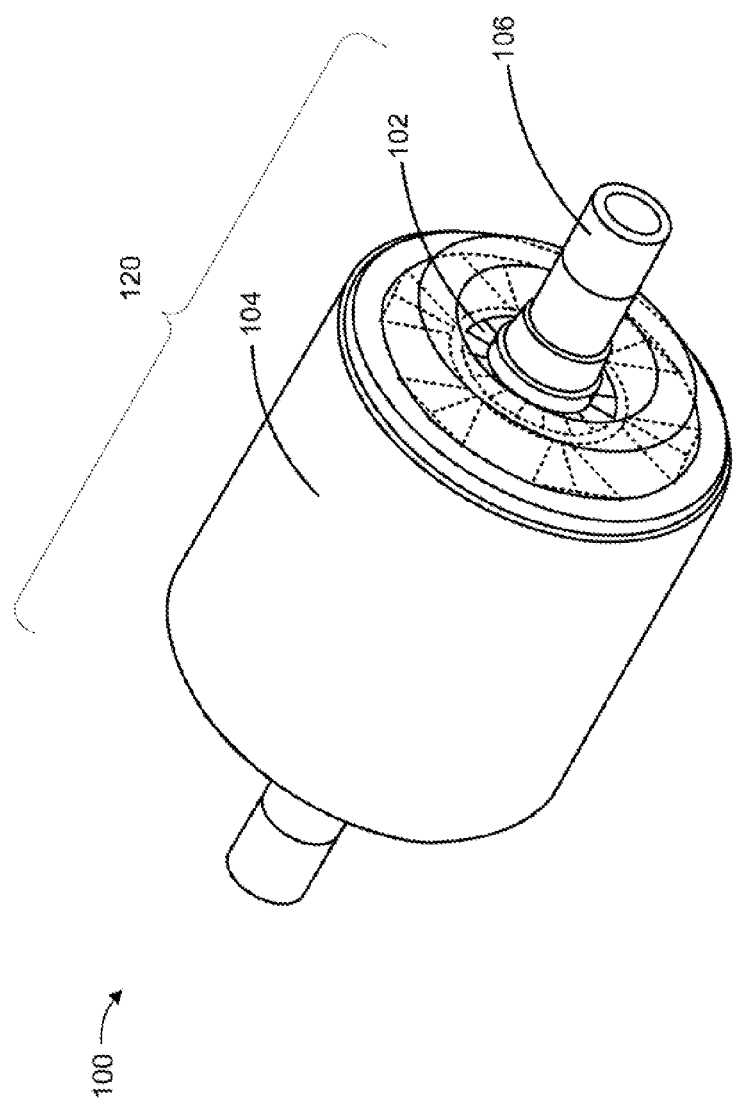
FIG. 1B is a perspective view of a high performance actuator motor utilizing a single motor configuration according to an alternative embodiment described herein.

As will be described in greater detail below, this dual actuator motor configuration 110 provides increased acceleration characteristics as compared to a single actuator motor configuration 120 shown in FIG. 1B and containing only one rotor 102 and stator 104. Moreover, according to various dual-motor embodiments, the two motors 101A and 101B may be operated together so that they both contribute to the torque production, or operated independently, depending on the desired implementation. According to one implementation, the dual actuator motor 100 operates only one motor 101A or 101B at a time. In doing so, the idle motor provides redundancy for the operating motor should the operating motor 101 fail. Having redundant actuation systems can be particularly beneficial when implemented within a control system of an aircraft, spacecraft, or other vehicle.

Figure 4B:
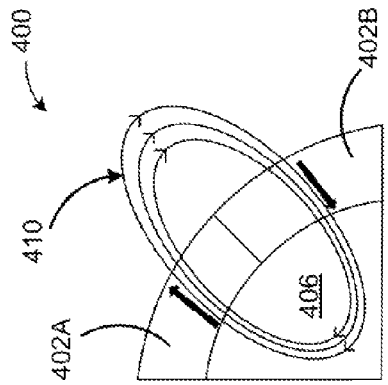
FIG. 4B is a partial cross-sectional view of a conventional rotor of a permanent magnet motor, showing the conventional permanent magnet configuration and corresponding flux distribution.

As seen in FIG. 1A, the rotor shaft 106 is configured with a hollow core 108. As will be discussed further below with respect to FIGS. 4 and 5, the configuration of the rotors 102 allows for the hollow core 108, which lowers the rotational inertia of the actuator motor and provides a path for cooling air. According to various embodiments (not shown), the hollow core 108 may include fins, blades, or any number and type of flow assist devices that are capable of creating, directing, or otherwise assisting in the flow of cooling air through the hollow core 108. While the dual actuator motor configuration 110 is shown to include the two stators 104A and 104B separated along the rotor shaft 106, alternative configurations (not shown) provide for the stators 104A and 104B to abut one another, or to be spaced farther apart than the configuration shown in the various figures. Moreover, it should be appreciated that the concepts described herein are not limited to two motors 101A and 101B. Rather, any number of motors 101 may be utilized along the rotor shaft 106 according to the desired application for which the motor will be utilized.

Figure 2:
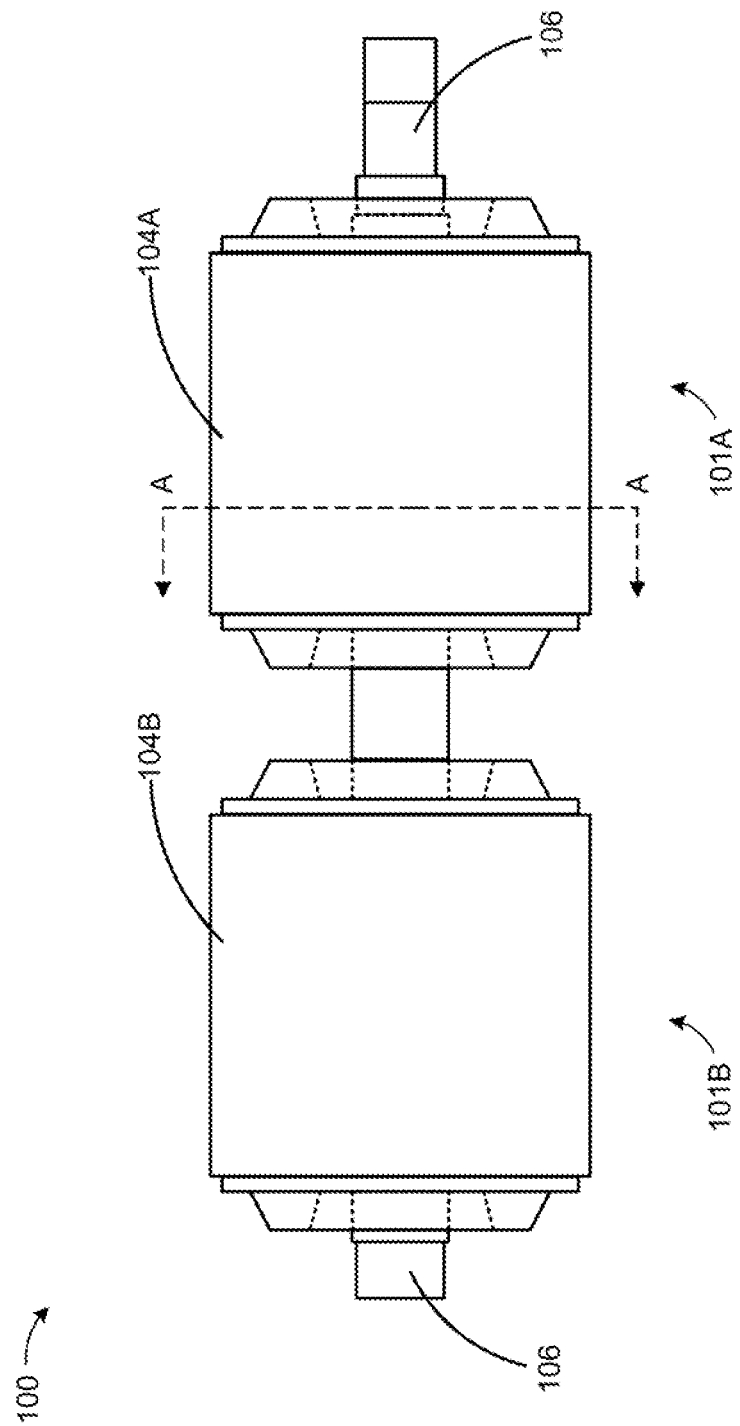
FIG. 2 is a side view of the high performance actuator motor of FIG. 1A according to various embodiments presented herein.
Figure 3:
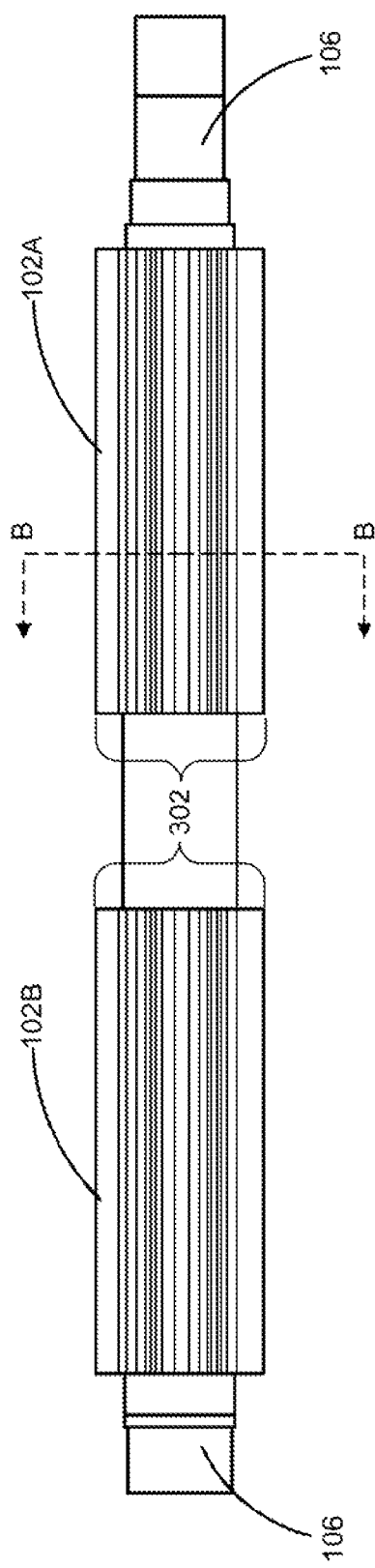
FIG. 3 is a side view of the high performance actuator motor of FIG. 2 without the stators, showing the rotors and corresponding rotor shaft according to various embodiments presented herein.

Turning now to FIG. 2, a side view of the actuator motor 100 of FIG. 1A is shown. As previously stated, this embodiment includes motors 101A and 101B, which share a common rotor shaft 106, but have separate stators 104A and 104B, respectively. A cross-sectional view of the actuator motor 100, taken along line A-A will be shown in FIG. 8A and described below. FIG. 3 shows a side view of the actuator motor 100 with the stators 104A and 104B removed. The rotors 102A and 102B are visible along the rotor shaft 106. The rotors 102 include a number of permanent magnets 302 arranged according to an optimized array around the rotor shaft 106. This configuration of the permanent magnets 302 contrasts conventional radial magnet configurations in that the optimized array described herein provides for magnetic flux fields that are entirely external to the rotor shaft 106.

Figure 4A:
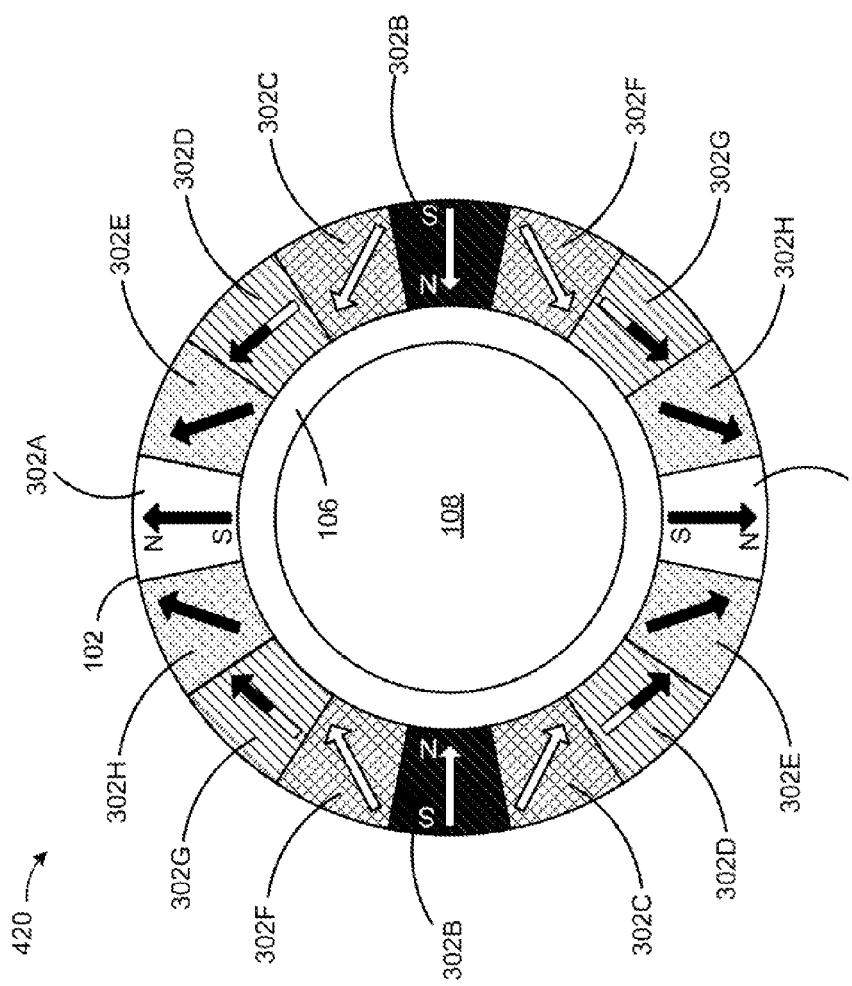
FIG. 4A is a cross-sectional view of a rotor of a high performance actuator motor, taken along line B-B of FIG. 3 and showing the optimized permanent magnet configuration according to various embodiments presented herein.

FIG. 4A shows a cross-sectional view of the rotor 102, taken along line B-B of FIG. 3. The rotor 102 includes a number of contiguous permanent magnets 302, or magnets or magnet segments that abut one another, arranged in an optimized magnetic array around an outer circumference of the rotor shaft 106. According to various embodiments, as shown in FIG. 4A, the optimized array of the permanent magnets 302 includes arranging the magnets according to a Halbach array configuration 420. Before discussing the Halbach array configuration 420 utilized within the rotor 102 of the dual actuator motor 100 and single actuator motor 200 described herein, a conventional radial configuration 400 of the permanent magnets of a conventional permanent magnet motor will be described with respect to FIG. 4B for comparison purposes.

As discussed above, the conventional radial configuration 400 of permanent magnets in a permanent magnet motor includes an array of magnets that are alternating in north/south radial configurations such that one magnet 402A is aligned with the radius of the rotor with flux lines 410 extending radially outward from the north pole of the magnet away from the rotor shaft 406, with the successive magnet 402B having flux lines 410 that extend radially inward from the inward-facing north pole of that magnet. This repeating pattern results in a substantially symmetric flux distribution 410 with flux traversing through the back iron of the solid rotor shaft 406, as well as outward toward the stator windings. Also as discussed above, the substantial quantities of flux within the back iron of the rotating shaft results in eddy currents that create undesirable quantities of heat.

In contrast, an optimized array would be an array of permanent magnets 302 that does not have radially aligned magnetic flux distributions. Utilizing the Halbach array configuration 420 shown in FIG. 4A, each permanent magnet 302 is positioned with the poles of the magnet oriented in different directions, with the tangential magnetic field components, rather than each successive magnet being oriented with the poles aligned radially inward and outward as with the conventional configuration 400 described above. The Halbach array configuration 420 used to create the rotor 102 includes two outwardly-configured magnets 302A that are positioned on opposing sides of the rotor shaft 106 with radially aligned poles. The radially aligned poles route the corresponding magnetic flux flows in the direction of the arrows, radially outward from the south pole of the outwardly-configured magnet 302A through the north pole and out of the rotor 102.

Spaced 90 degrees from the outwardly-configured magnets 302A are two inwardly-configured magnets 302B that are positioned on opposing sides of the rotor shaft 106, also with radially aligned poles. However, these inwardly-configured magnets 302B are configured with the north poles inward and south poles outward so that the corresponding magnetic flux flows in the direction of the arrows, radially inward from the south pole of the inwardly-configured magnet 302B through the north pole toward the rotor shaft 106. Between each inwardly-configured magnet 302B and outwardly-configured magnet 302A are three magnets, or magnetic material blocks or segments, having poles positioned in a manner that effectively directs the flux from the inwardly-configured magnet 302B to the outwardly-configured magnet 302A and generally away from the rotor shaft 106 and hollow core 108. Essentially, the permanent magnets 302 are arranged to substantially aggregate the magnetic flux on the exterior side of the rotor 102, while canceling the flux on the interior of the rotor 102.

Figure 5:
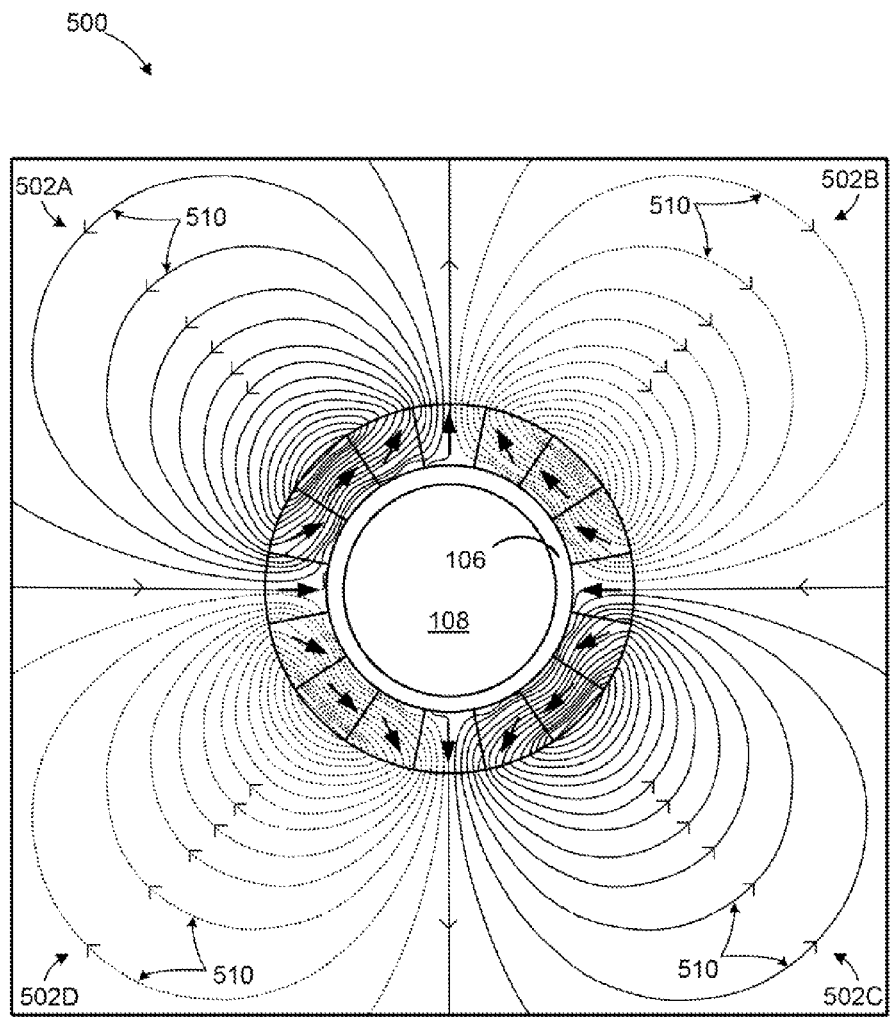
FIG. 5 is the cross-sectional view of the rotor of FIG. 4A, showing the magnetic field distribution from the optimized permanent magnet configuration according to various embodiments presented herein.

As to the specific positioning of the magnets 302 according to the Halbach array configuration 420 shown in FIG. 4A, it can be seen that there are two magnets 302, one on either side of the rotor 102, for each pole positioning. For example, magnets 302C are similarly positioned on opposing sides of the rotor shaft 106 adjacent to magnets 302B. The Halbach array configuration 420 continues in the same manner with magnets 302D-302H. It should be understood that the implementation shown and described here for the Halbach array configuration 420 is only one possible configuration. While this implementation utilizes 16 permanent magnets 302 to create a 4-pole array, alternative embodiments may use 24, 32, or any other applicable number of permanent magnets 302 to create a 4-pole, 6-pole, 8-pole, or any other number of pole configurations. The effect of the Halbach array configuration 420 can be seen in FIG. 5. FIG. 5 shows the magnetic flux lines 510 that result from the positioning of the magnets 302 in the Halbach array configuration 420. As shown, there are four poles and corresponding flux field distributions 502A-502D (collectively referred to as 502).

Flux field distributions 502A and 502C provide counter-clockwise magnetic flux flows, while flux field distributions 502B and 502D provide clockwise magnetic flux flows. As discussed above, the Halbach array effect aggregates the magnetic flux on the exterior of the rotor 102, while substantially canceling out, or eliminating, the magnetic flux on the interior of the rotor 102. The ability to effectively eliminate the magnetic flux on the interior of the rotor 102 allows the rotor shaft 106 to have the hollow core 108 and eliminates the need for mounting the permanent magnets 302 on magnetic material to provide a low reluctance path for the magnetic flux. The result is a substantial reduction in weight and corresponding rotational inertia of the rotor 102, which improves the acceleration capabilities of the actuator motor 101. Also as previously discussed, the exterior flux field distributions 502 prevent excessive heating of the rotor 102 and associated components conventionally produced from undesirable eddy currents during operation of the motor 101.

It should be clear from the figures and corresponding disclosure that the precise structural and operational characteristics of the rotor 102 and the associated components will depend on the particular application of the corresponding motor and are not limited to any particular dimensions, materials, or other criteria. Illustrative examples of configurations according to one implementation will be discussed below with respect to FIGS. 13 and 14.

Figure 6:
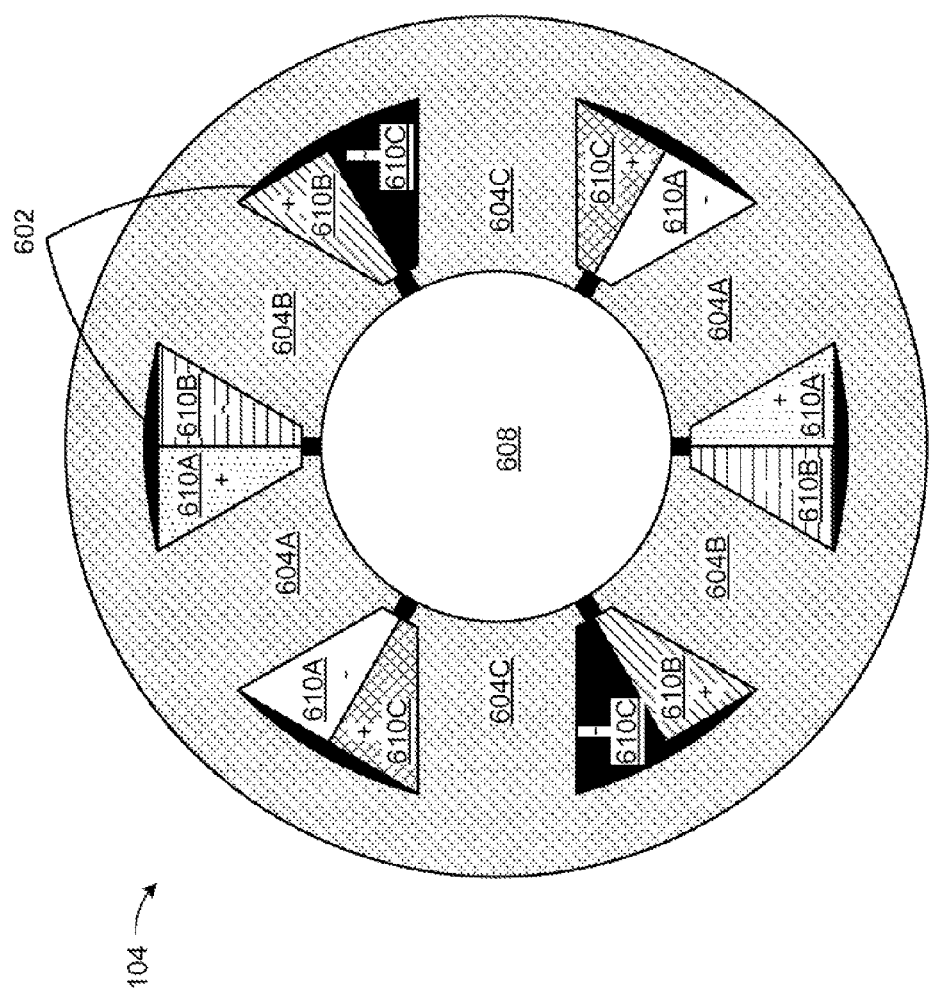
FIG. 6 is a cross-sectional view of a stator of a high performance actuator motor, taken along line A-A of FIG. 2, showing the various stator components according to the various embodiments presented herein.

Turning now to FIG. 6, the configuration of a stator 104 of an actuator motor 100 will now be described according to one embodiment. The stator 104 includes six stator slots 602, which encompass corresponding stator windings 610A-610C (collectively referred to as 610). According to one embodiment, the actuator motor 100 receives a three-phased power input. Consequently, this embodiment utilizes six stator teeth 604, including opposing stator teeth pairs 604A, 604B, and 604C. The stator windings 610 wrap around the stator teeth 604 within the stator slots 602. Looking at the cross-sectional view shown in FIG. 6, the stator windings 610 wrap around each stator tooth 604 traversing in and out of the page as indicated by the "+" and "−" notations, respectively, associated with each adjacent pair of stator slots 602.

For example, the stator teeth 604A shown in the upper left portion and opposing lower right portion of the stator 104 include stator windings 610A that wrap around the teeth. One stator tooth 604A provides a first coil for the first phase, while the opposing stator tooth 604A, 180 degrees around the stator core aperture 608, provides a second coil for the first phase. These two coils are connected in series.

Similarly, for the second phase of power, the stator 104 includes the stator teeth 604B shown in the upper right and lower left portions of the stator 104, each having corresponding stator windings 610B wrapped around the tooth. One stator tooth 604B provides a first coil for the second phase, while the opposing stator tooth 604B, 180 degrees around the stator core aperture 608, provides a second coil for the second phase. These two coils are connected in series.

Finally, according to this example, for the third phase of power, the stator 104 includes the stator teeth 604C shown along a horizontal axis through the stator core aperture 608 on opposing sides of the stator 104. Each stator tooth 604C has stator windings 610C wrapped around the tooth. One stator tooth 604C provides a first coil for the third phase, while the opposing stator tooth 604C, 180 degrees around the stator core aperture 608, provides a second coil for the third phase. These two coils are connected in series.

Figure 7:
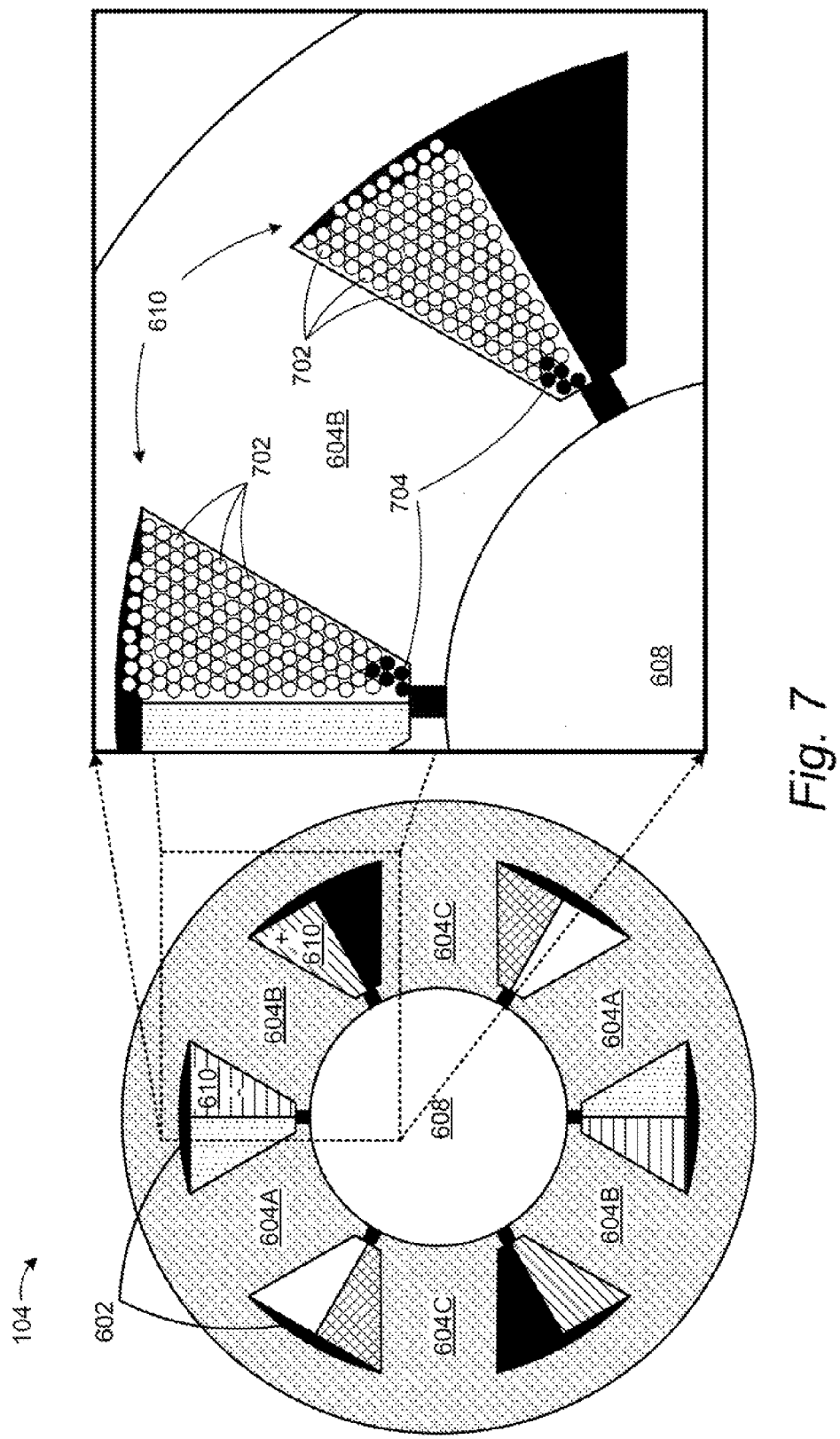
FIG. 7 is a cross-sectional view and corresponding enlarged partial view of the stator of the high performance actuator motor of FIG. 6, showing stator windings according to various embodiments presented herein.

FIG. 7 shows an enlarged view of a portion of the stator 104, illustrating details of the stator windings 610 according to one embodiment. In general, the stator slot 602 area is designed suitably to house the conductors 702 such that the stator motor 100 can deliver the continuous torque while operating within the thermal limits. The stator teeth 604 of the actuator motor 100 are designed suitably to render the motor with a high peak torque production capability with low iron loss. According to this embodiment, the stator windings 610 are made up of a number of conductors 702, such as copper wires, that are wound around the stator teeth 604. Although other examples will be described in greater detail below with respect to FIGS. 14A-14C, this example shows five parallel strands 704 of 21 AWG copper wire used to realize a first coil of the stator winding 610. A second coil, which is connected in series with the first coil, is similarly created on the opposing stator tooth 180 degrees around the stator 104. It should be appreciated that the embodiments described herein are not limited to two coils per stator winding 610.

Figure 8:
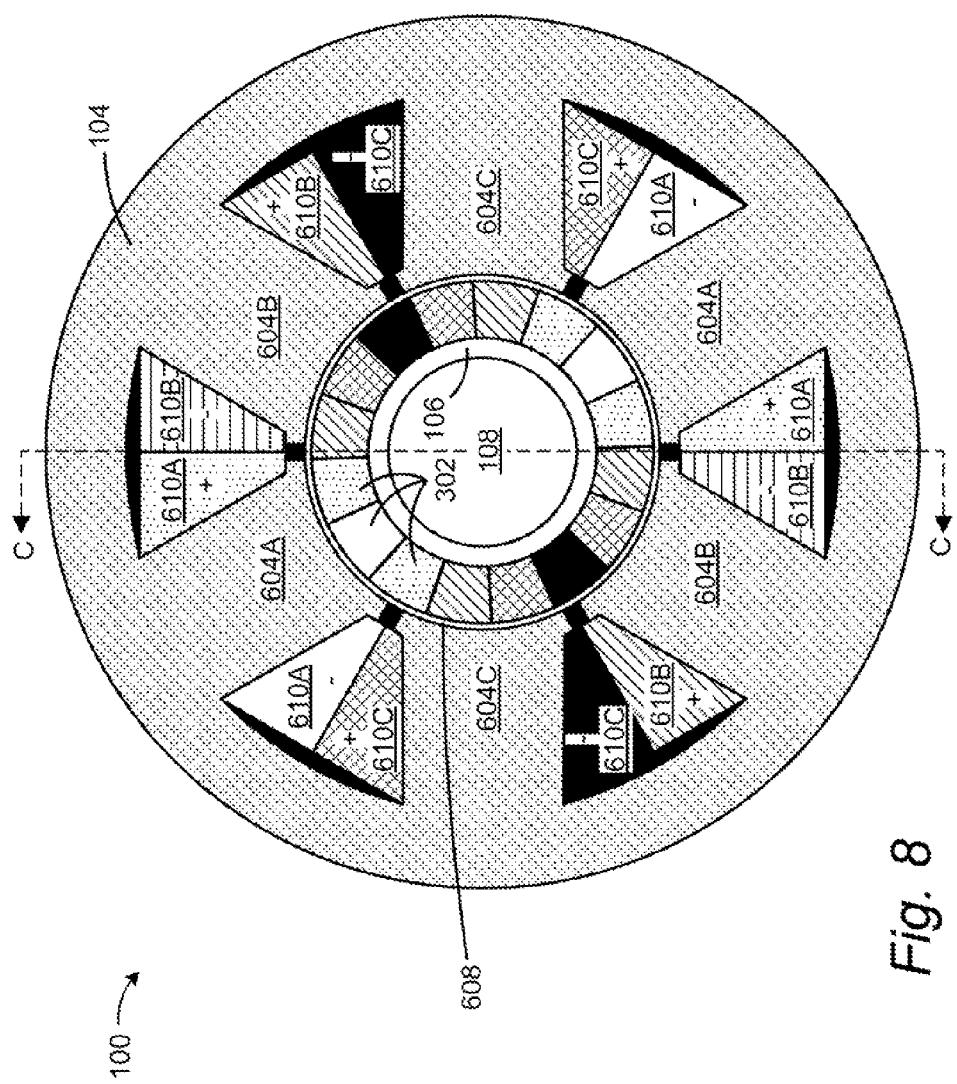
FIG. 8 is a cross-sectional view of the high performance actuator motor of FIG. 2 having six stator slots, taken along line A-A and showing the various components of the motor according to various embodiments presented herein.

FIG. 8 shows a cross-sectional view of the actuator motor 100, taken along line A-A of FIG. 2. The rotor 102, including the permanent magnets 302 and rotor shaft 106, can be seen positioned within the stator core aperture 608 of the stator 104. As will become clear from the discussion below, by providing the three-phase power input through the appropriate stator windings 610, the resulting electro-magnetic forces interact with the four flux field distributions 502 and corresponding four magnetic poles created by the Halbach array configuration 420 of the permanent magnets 302 to impose a torque on the rotor shaft 106, and consequently actuate any component connected to the actuator motor 100.

Figure 9:
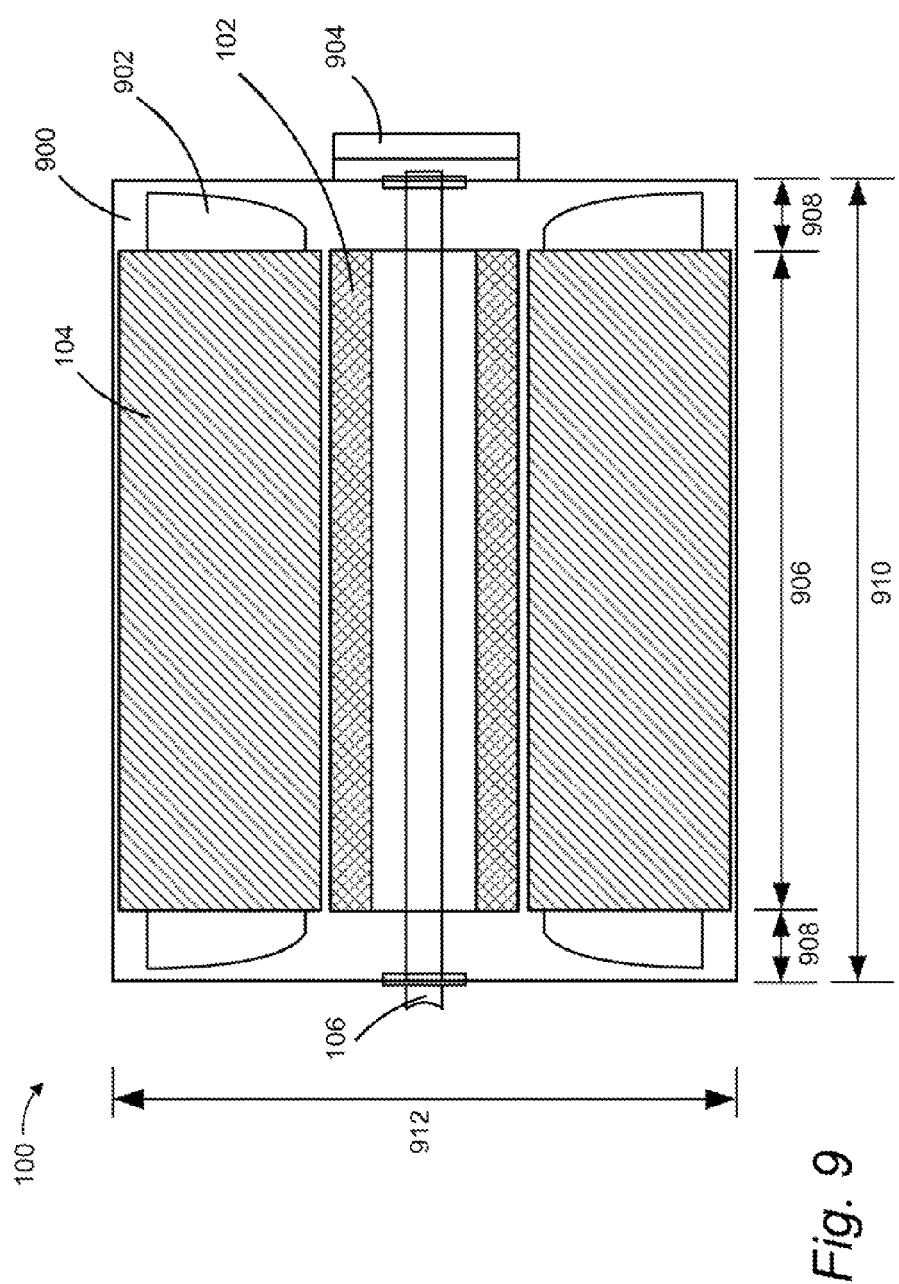
FIG. 9 is a cross-sectional view of the high performance actuator motor of FIG. 8, taken along line C-C and showing the various components of the motor according to various embodiments presented herein.

FIG. 9 shows a cross-sectional view of a single motor 101 of the actuator motor 100 of FIG. 8, taken along line C-C. According to this embodiment, the rotor shaft 106 is encompassed by the rotor 102, which is rotatable within the stator 104. A casing 900 surrounds the stator 104. The end windings 902 can be seen protruding from the stator 104. The end windings 902 are the portions of the coils that wrap around the stator teeth 604. The particular size/dimensions of the end windings 902 may be influenced by the selected configuration of the stator windings 610. For example, if designing the actuator motor 100 for an implementation with space constraints, in order to have a longer active length for more torque production, a concentrated stator winding configuration will lead to shorter end windings 902.

A rotary position angle sensor 904 is mounted to the actuator motor 100 at one end of the rotor 102. The stator winding excitations are controlled based on the rotor position angle information. Consequently, the rotary position angle sensor 904 is used to determine and encode the angular positioning of the rotor 102 with respect to the stator 104. In general, the rotary position angle sensor 904 may include any type of sensor/encoder capable of detecting this positioning. More specifically, an exemplary rotary position angle sensor 904 is able to operate at high speeds (such as 15,000+RPMs), has a low inertial effect such that the encoder inertia does not interfere with the dynamic performance of the actuator motor 100, is compact in size, is capable of high temperature operation (such as 80 degrees C. ambient), and is capable of bi-directional operations.

Conventional magnetic rotary encoders are large in size, not suitable for high speed operation, and offer contact resistance. Optical encoders, while capable of contact-free operation, are not suitable for high temperature operation. According to one embodiment, the rotary position angle sensor 904 is a contactless magnetic encoder. The contactless magnetic encoder is advantageous in that it is frictionless, has a very low inertial effect, and is capable of operation at high ambient temperatures.

The actuator motor 100 has a total diameter, with casing 900, equal to diameter 912. An example value for diameter 912 will be provided below with respect to FIGS. 13A and 13B when describing an illustrative implementation of the actuator motor 100. The motor has a stack length 906 corresponding to the length of the stator without the end windings 902, and a total length 910 that includes the end winding length 908 for each side of the motor. Again, example values for these dimensions will be provided below.

Figure 10:
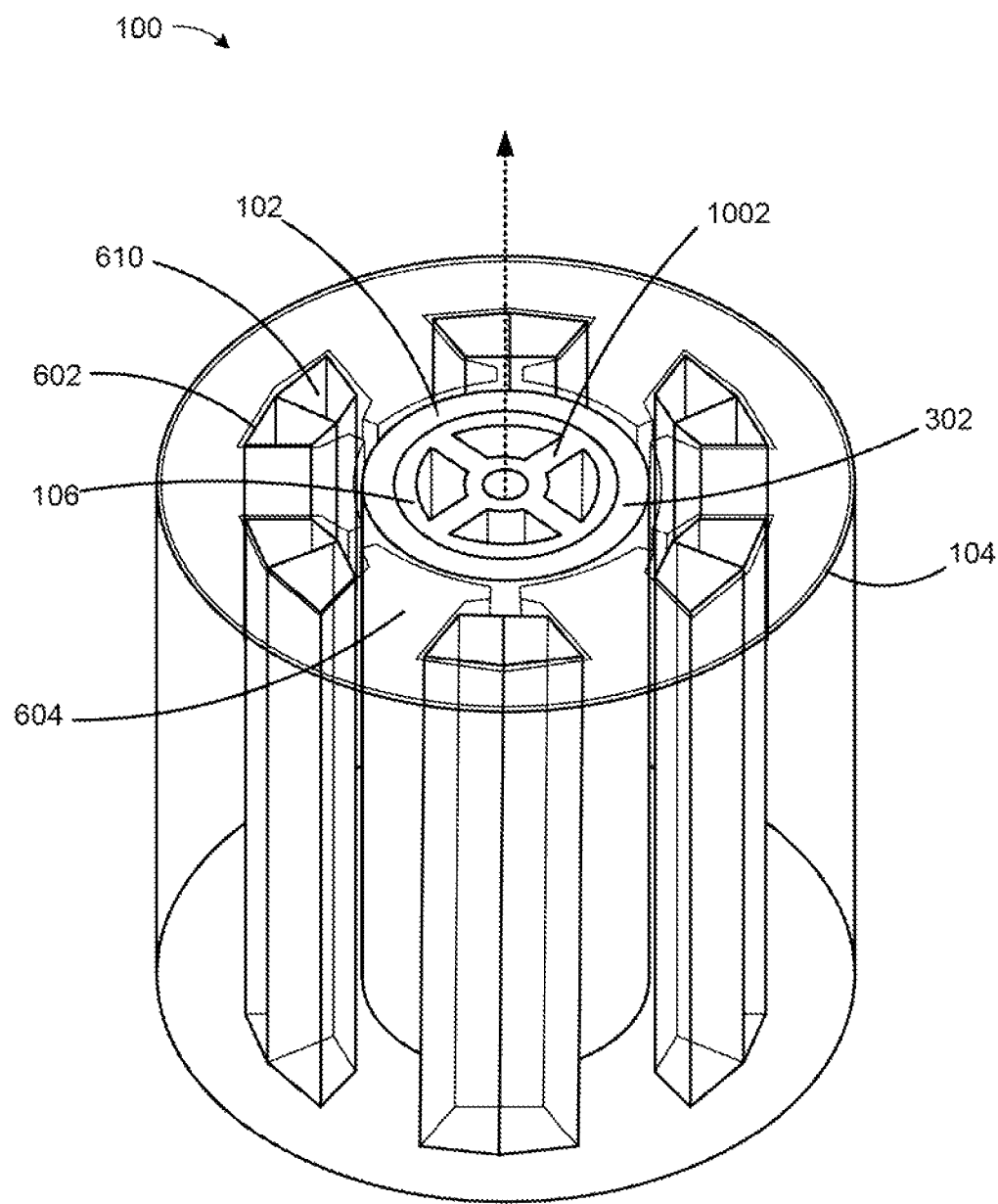
FIG. 10 is a perspective view of a high performance actuator motor, showing various components of the motor according to various embodiments presented herein.

FIG. 10 shows a perspective view of a single motor 101 with various transparent components to more clearly show various aspects of an actuator motor 100. With this view, the stator slots 602 and corresponding stator windings 610 can be seen, as well as the stator teeth 604. The rotor 102 can be seen with the permanent magnets 302 mounted to the rotor shaft 106. According to this embodiment, the rotor shaft 106 includes four spokes 1002 for structural support. The number of spokes 1002, or whether or not spokes 1002 are included within the rotor shaft 106, may be dependent upon the specific implementation for which the actuator motor 100 is designed, as well as upon the characteristics of the materials and components used within the actuator motor 100. Optimally, the rotor shaft 106 is completely hollow to minimize weight and rotational inertia and to maximize the internal area available for cooling air. However, if the rotor shaft 106 cannot withstand the desired operational conditions given the parameters of the selected rotor shaft material, then a number of spokes 1002 may be used to support the rotor shaft 106 while providing for air circulation and cooling via the hollow portions of the shaft between the spokes 1002.

Figure 11:
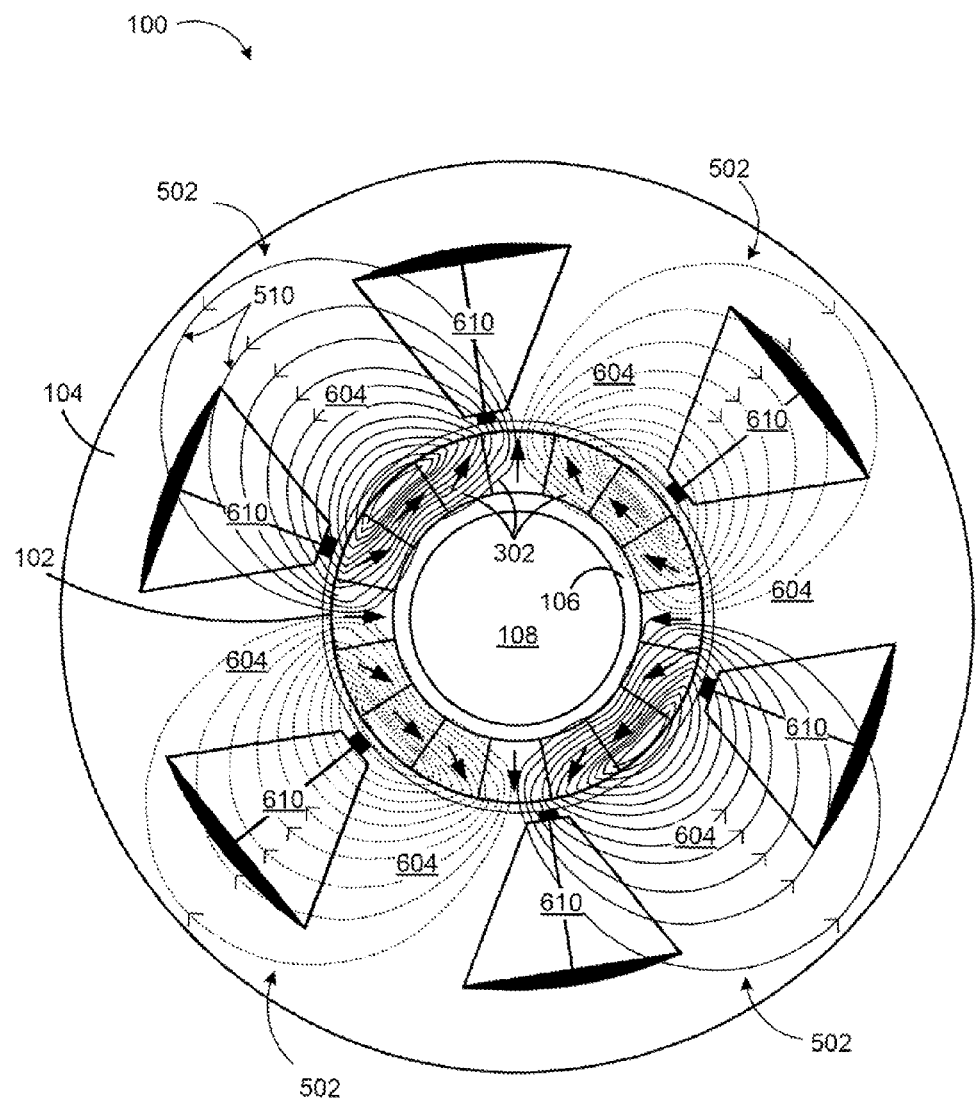
FIG. 11 is a cross-sectional view of the high performance actuator motor of FIG. 2, taken along line A-A and showing the interaction of the magnetic fields of the rotor with the stator windings according to various embodiments presented herein.

FIG. 11 provides a visualization of the interaction between the stator windings 610 of the stator 104 and the magnetic flux field distributions 502 from the permanent magnets 302 of the rotor 102. During operation of the actuator motor 100, the stator windings 610 may be excited according to a frequency of a three-phased electrical input. Doing so effectively creates and translates the stator magnetic fields (not shown) around the stator 104 between the stator teeth 604. This rotating stator magnetic field interacts with the four magnetic rotor poles and corresponding magnetic flux field distributions 502 produced by the Halbach array configuration 420 of the permanent magnets 302, creating a torque in the rotor shaft 106 that rotates the rotor 102, accelerating or decelerating the rotor 102 according to the electrical input and corresponding interaction of the stator magnetic fields with the flux fields from the permanent magnets 302.

Because the embodiment shown utilizes four rotor poles and six stator windings 610, the actuator motor 100 utilizes a fractional pole pitch. In other words, the rotor 102 has a 90-degree pole arc since there are four poles. Because the stator slots are positioned less than 90 degrees apart, the actuator motor 100 has a fractional pole pitch, which is beneficial in minimizing torque ripple and cogging that is prevalent in many conventional permanent magnet motors.

Torque ripple is a concern in many aerospace applications due to stall force requirements and high torque delivery design parameters. Many actuator implementations call for high torque outputs. Consequently, the motor is sized to provide high torque output. However, another design concern is the potential for the motor to stall out where the torque output is at a minimum. A design goal is to minimize the size and weight of the actuator motor 100 while maintaining high torque output capabilities, as well as to minimize the potential for stalling the motor by reducing the force required to maintain rotation of the rotor 102 at slow speeds. It is advantageous, therefore, to minimize the torque ripple, or the difference between the minimum output force to the maximum output force, associated with the actuator motor 100. Reducing torque ripple additionally reduces vibration and acoustic noise, which are undesirable side effects of torque ripple. This is accomplished utilizing the embodiments described herein.

Specifically, the designed arrangement of the permanent magnets 302, the number of stator slots 602, and the stator winding distributions may affect the torque pulsation characteristics. As will be described in greater detail below when discussing a practical example of an actuator motor 100 according to the concepts disclosed herein, various embodiments of the actuator motor 100 provide a torque ripple of approximately 3.4%, which is substantially reduced over conventional torque ripple values. Of course, it should be appreciated that current profiling and/or skewing techniques may be used to further reduce the torque ripple values.

Figure 12:
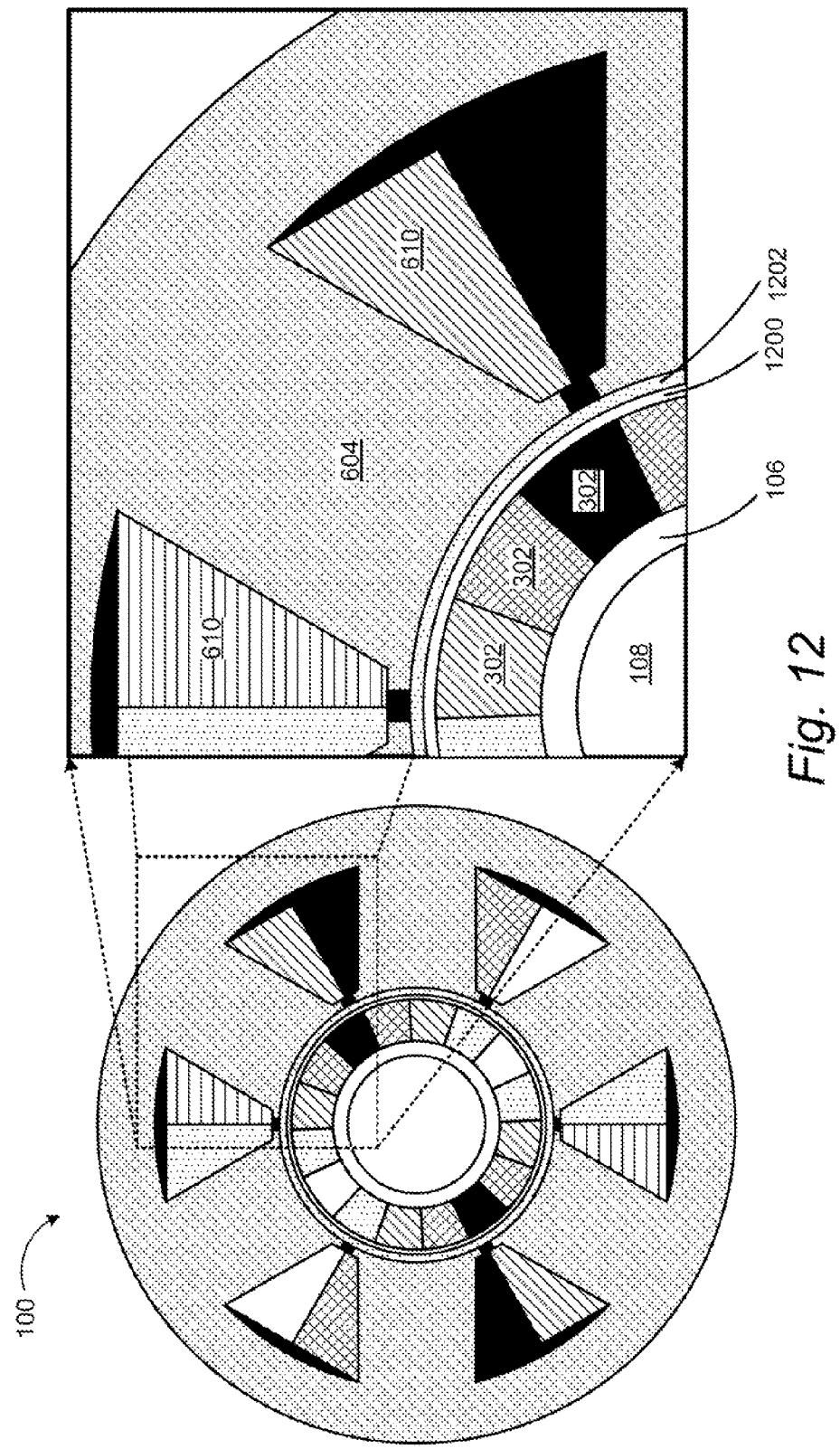
FIG. 12 is a cross-sectional view and corresponding enlarged view of the high performance actuator motor of FIG. 2, taken along line A-A and showing a retaining sleeve around the rotor according to one embodiment presented herein.

Turning now to FIG. 12, an enlarged portion of an actuator motor 100 is shown. The enlarged view shows a retaining sleeve 1200 encompassing the rotor 102. An air gap 1202 is present between the retaining sleeve 1200 and the stator teeth 604. It should be appreciated that FIG. 12 and all other drawings are not drawn to scale. During high speed operation, the surface mounted permanent magnets 302 are subjected to a substantial amount of centrifugal force. As a result, glue and adhesives do not provide adequate means for securing the permanent magnets 302 to the outer surface of the rotor shaft 106.

According to various embodiments, the permanent magnets 302 are secured by encapsulating them in a retaining sleeve 1200, which is made from a high-strength material. The retaining sleeve 1200 should have enough radial and tangential stress withstanding capability to provide mechanical stability to the rotor. Moreover, the retaining sleeve 1200 should have a thickness that is as small as possible while providing the mechanical stability described above. By minimizing the thickness of the retaining sleeve 1200, the weight of the sleeve is minimized, the effective air gap between the retaining sleeve 1200 and the stator teeth 604 can be small, which allows the Halbach array configuration 420 to be realized with reduced magnet thickness. According to various embodiments, the retaining sleeve 1200 is conductive to aid in heat dissipation into the air gap between the sleeve and the stator teeth 604. Examples of suitable retaining sleeve 1200 characteristics will be described in greater detail below.

Figure 13A:
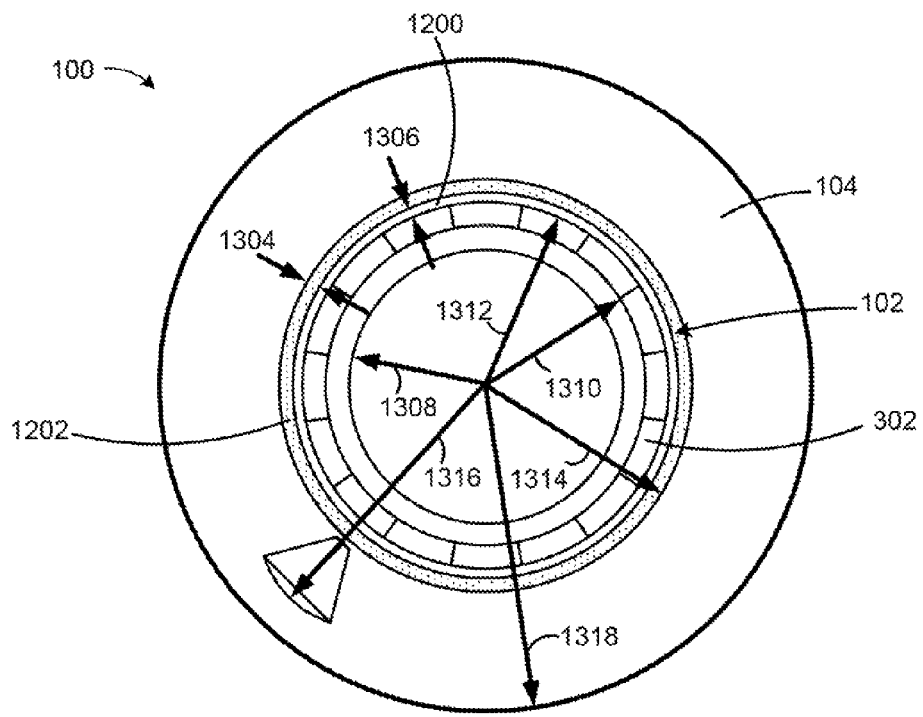
FIGS. 13A and 13B are cross-sectional views of a high performance actuator motor, taken along line A-A of FIG. 2, showing various dimensional examples according to various embodiments presented herein.
Figure 13B:
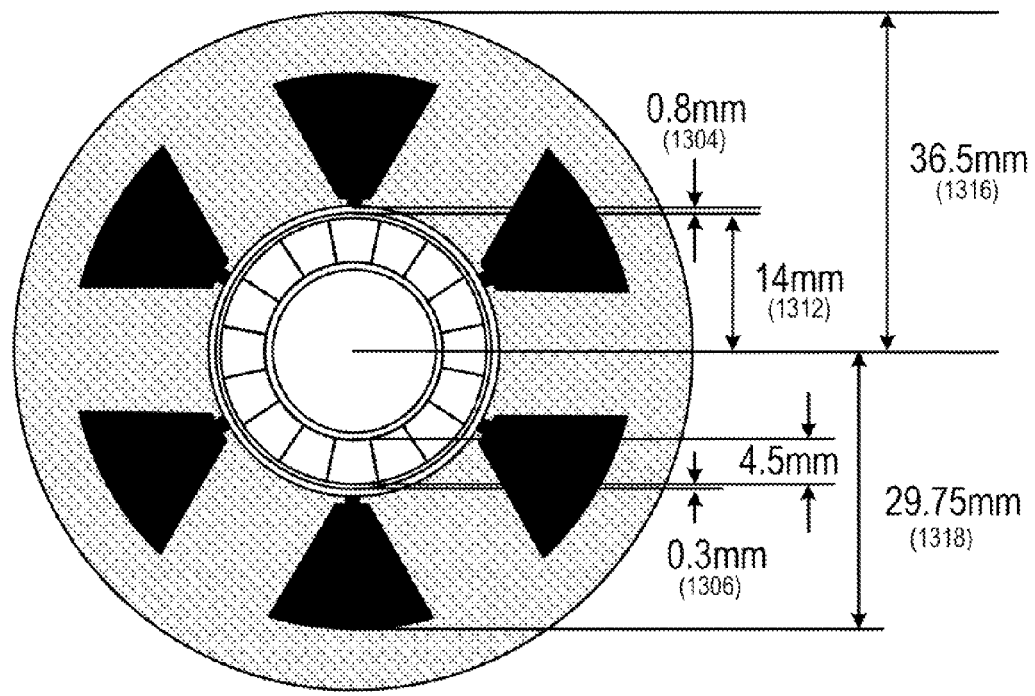

Now that the various aspects of an actuator motor 100 have been generally described, a more detailed description that includes the design criteria and illustrative example dimensions and other parameters according to one or more embodiments will be described. Turning to FIGS. 13A and 13B, cross-sectional view of an actuator motor 100 will be shown to describe some specific dimensional characteristics of an actuator motor 100 according to one embodiment. The views have been simplified to include only representations of the stator 104, the rotor 102, the permanent magnets 302, the retaining sleeve 1200, and the rotor shaft 106. It should be understood that the cross-sectional views of FIGS. 13A and 13B are not drawn to scale.

Table 1 shows some representative values, according to one embodiment, of various dimensions and criteria of an actuator motor 100, including the air gap width 1304 associated with the air gap 1202 between the rotor 102 and the stator 104, the retaining sleeve thickness 1306, the inner rotor shaft radius 1308, the outer rotor shaft radius 1310, the outer magnet array radius 1312, the inner stator radius 1314, the stator slot radius 1316, and the outer stator radius 1318. It should be appreciated that the various concepts and technologies described herein are not limited to these values. Rather, these values merely provide an illustrative example of one implementation of the actuator motor 100.

TABLE 1

| Parameter | Value |
| --- | --- |
| Air gap width 1304 | 0.8 mm |
| Retaining sleeve thickness 1306 | 0.3 mm |
| Inner rotor shaft radius 1308 | 7.75 mm |
| Outer rotor shaft radius 1310 | 9.5 mm |
| Rotor shaft thickness (1310 minus 1308) | 1.75 mm |
| Outer magnet array radius 1312 | 14 mm |
| Magnet array thickness (1312 minus 1310) | 4.5 mm |
| Inner stator radius 1314 | 15.1 mm |
| Stator slot radius 1316 | 29.75 mm |
| Outer stator radius 1318 | 36.5 mm |
| Number of coils per phase (series connected) | 2 |
| Number of turns per coil | 22 |

As seen in FIGS. 13A and 13B, as well as in FIG. 9, this implementation of the actuator motor 100 provides a motor with a diameter of 73 mm, which does not include the motor casing 900. According to one embodiment, the motor has a total diameter 912 of 74.4 mm. The actuator motor may have a stack length 906 of 76 mm and end winding lengths 908 of approximately 9.75 mm, resulting in a total length 910 of 95.5 mm. It should be understood that these values are per motor 101.

Table 2 shows various material selections corresponding to components of the actuator motor 100 according to one embodiment. It should again be appreciated that these selections represent only one embodiment and the various concepts disclosed herein may include any type of suitable materials depending on any number of applicable factors such as performance goals for the motor, operating environment, cost, weight limitations, and others.

TABLE 2

| Motor Component | Material | Example Property |
| --- | --- | --- |
| Stator 104 | Steel | Saturation flux density 2 T |
| Stator winding 610 | Copper | — |
| Rotor Shaft 106 | Steel/Stainless steel | Saturation flux density 2 T |
| Permanent Magnets 302 (Halbach array) | SmCo28 | Residual flux density 1.08 T |
| Retaining Sleeve 1200 | Titanium | — |

Table 2 shows one example of the permanent magnets 302 being used in the Halbach array configuration 420 as being SmCo28, or Samarium-Cobalt (SmCo), magnets. The maximum ambient temperature of the dual actuator motor 100 is 80 degrees C. according to one embodiment. A thermal analysis of the actuator motor 100 determines that operating temperature of the permanent magnets 302 of the motor is more than 170 degrees C. Therefore, neodymium (NdFeB) type permanent magnets may not be suitable for realizing the Halbach array of the motor under those operating parameters. However, SmCo based rare earth magnets can operate at much higher temperature than the NdFeB type permanent magnets. The high curie temperature of the SmCo based permanent magnets 302 allow them to operate above 200 degrees C. Furthermore, the SmCo based magnets are thermally stable and not susceptible to corrosions.

One consideration when selecting the type of permanent magnets 302 is that the remnant flux density of the SmCo type permanent magnets 302 is lower than the residual flux density of the NdFeB type permanent magnets 302. Table 3 compares various properties of sintered SmCo and sintered NdFeB. According to one or more exemplary embodiments, the SmCo based permanent magnets are selected for realizing the Halbach array of the actuator motor 100. It should be clear, however, that the specific type of permanent magnets 302 utilized within the Halbach array configuration 420 may depend upon the particular implementation of the actuator motor 100.

TABLE 3

| Parameter | Sintered SmCo | Sintered NdFeB |
| --- | --- | --- |
| Remanence (T) | 1.05 | 1.2 |
| Intrinsic coercivity (kA/m) | 1500 | 1900 |
| Maximum B.H product (kJA/m$^3$) | 220 | 320 |
| Resistivity (micro.ohm.cm) | 86 | 150 |
| Maximum working temperature (deg C.) | 250-350 | 150-200 |
| Curie temperature (deg C.) | 700 | 310 |
| Temperature coefficient of Remanence (%/deg C.) | −0.05 | −0.15 |
| Density (kg/m$^3$) | 8200 | 7500 |

Referring to FIGS. 12, 13A, and 13B, the retainer sleeve 1200 will be discussed in greater detail with respect to suitable materials and other design parameters according to one embodiment. As discussed above, due to the large centrifugal force present during high speed operations, the surface mounted permanent magnets 302 of the Halbach array may not be secured to the rotor with adhesive alone. Therefore, the magnets are secured by encapsulating them in a retaining sleeve 1200, made of a suitable high-strength material. From a mechanical design consideration, the retaining sleeve 1200 should have enough radial and tangential stress withstanding capability so that it can provide mechanical stability to the rotor 102. From an electrical design consideration, the thickness of the sleeve should be as small as possible, so that the effective air gap 1304 can be small. With a small air gap 1304, the Halbach array configuration 420 can be realized with a minimal magnet thickness. Moreover, the retaining sleeve 1200 should cause less loss and should be conducive for heat dissipation into the air-gap.

Although any suitable retaining sleeve material may be used depending on the desired design parameters of the actuator motor 100, three materials may be particularly appropriate: titanium, copper, and glass-fiber. Table 4 below provides a comparison of characteristics of these materials.

TABLE 4

| Property | Titanium (Grade V) | Copper | Glass-fiber |
|---|---|---|---|
| Density | 4400 kg/m3 | 8900 kg/m3 | 2620 kg/m3 |
| Modulus of elasticity | 114 GPa | 110-128 GPa | 73 GPa |
| Tensile Strength | 895 MPa | 48 GPa | — |
| Yield Strength | 826 MPa | 70 GPa | 2400 MPa |
| Thermal Expansion Co-efficient | 8.6 μm · m−1 · K−1 | 16.5 μm · m−1 · K−1 | Very low |
| Thermal Conductivity | 21.9 W · m−1 · K−1 | 401 W · m−1 · K−1 | 0.05 W · m−1·K−1 |
| Electrical Resistivity | 0.420 μΩ · m | 16.78 nΩ · m | Very high |

According to one embodiment, the retaining sleeve 1200 is made from titanium. Titanium may be advantageous in that it offers high mechanical strength, lower density, favorable thermal conductivity, favorable electrical resistivity, high-temperature operation capability, and a similar thermal expansion coefficient as SmCo based permanent magnets 302. It should be appreciated that the retaining sleeve 1200 should be designed with a safety margin for over-speed operations in case the rotational speed of the rotor 102 exceeds the design limit. A 25% over-speed safety margin may be utilized. According to one embodiment, the retaining sleeve 1200 is designed for a maximum angular speed of the rotor 102 of approximately 1903 radians/second.

To secure the retaining sleeve 1200 around the permanent magnets 302 in the array, a hot shrinking method may be used. In this method, the outer diameter of the retaining sleeve 1200 is undersized with respect to the outer diameter of the rotor. When the sleeve is shrink fit on the permanent magnets 302 of the Halbach array, it applies a contact pressure on the permanent magnets 302. This force is responsible for retaining the magnets securely on the surface of the rotor 102.

During the maximum over-speed rotation of the actuator motor 100, the retaining sleeve 1200 is subjected to both radial and tangential stress. For stable mechanical operation, the pre-stress contact pressure should be greater than summation of the centrifugal pressure force applied by the rotor permanent magnets 302 and the centrifugal force in sleeve itself. Furthermore, for mechanical stable operation at the maximum over-speed, the maximum tangential stress withstanding capability of the retaining sleeve 1200 should be more than the total tangential stress on the sleeve under pre-stress condition and the tangential force on the sleeve due to rotation. According to one embodiment, taking these design parameters into consideration, the retaining sleeve thickness 1306 is 0.3 mm, the undersize of the sleeve is 0.2 mm, and the nominal diameter of the retaining sleeve 1200 is 28 mm. It should be appreciated, however, that the precise characteristics of the retaining sleeve 1200 will depend on the particular implementation of the actuator motor 100 and is not limited to the examples provided herein.

Figure 14A:
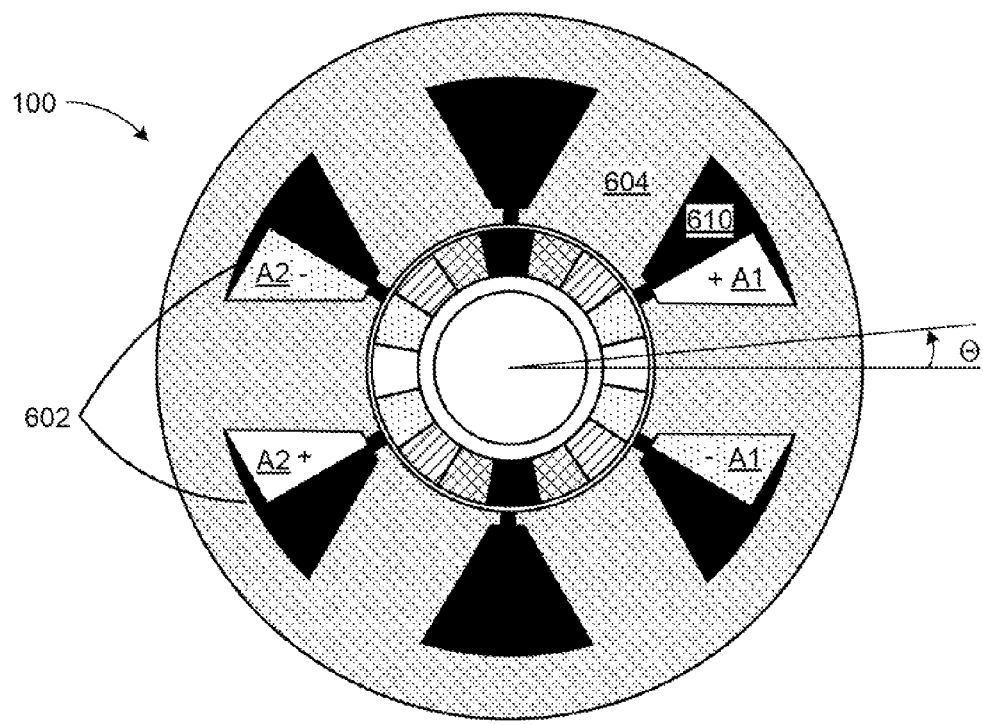
FIGS. 14A and 14B are a cross-sectional view of a high performance actuator motor having six stator slots and a corresponding winding diagram, respectively, according to one embodiment presented herein.
Figure 14B:
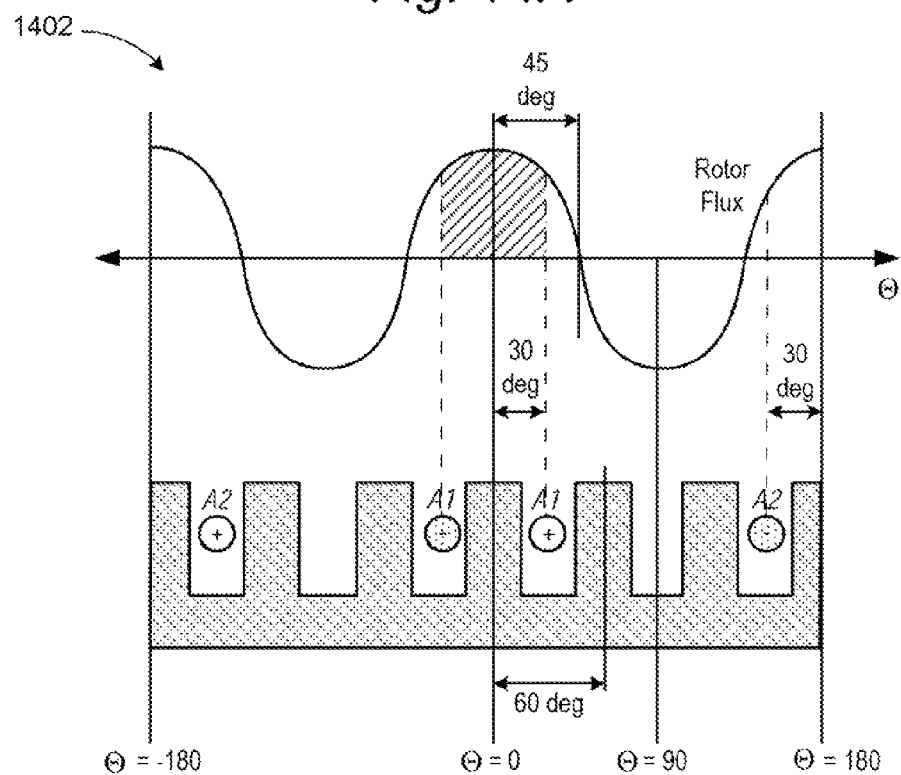

Turning to FIGS. 14A and 14B, a simplified cross-sectional view of an actuator motor 100 is shown, along with a corresponding developed winding diagram 1402, respectively. When designing the configuration of the actuator motor 100, selection of the number of stator slots 602 and the copper area for housing the stator windings 610 significantly impacts the resulting performance of the motor. For a given rotor structure and a fixed total ampere turns excitation, the torque produced in a permanent magnet machine may be decided by the stator winding distribution. With higher rotor flux linkage in the stator coils, higher electromagnetic torque can be produced.

The iron loss in a high speed actuator motor 100 is substantially influenced by the number of stator slots 602 in that stator 104. The iron loss increases with the increase of the number of stator slots 602. However, an increase in the number of stator slots 602 may reduce torque ripple effects. Therefore, a balance is needed to achieve the optimum performance of the actuator motor 100 according to the specific implementation. Hence, according to one embodiment, to reduce the iron losses in the actuator motor 100, the numbers of stator slots 602 are kept minimal. Specifically, in the embodiment shown in FIGS. 14A and 14B, the actuator motor 100 has six stator slots 602. For comparison purposes, an actuator motor 100 with twelve stator slots 602 having twelve stator windings 610 will be shown and described in FIGS. 15A and 15B.

As seen in FIG. 14A, the actuator motor 100 includes six stator slots 602 and stator windings 610, which can be viewed as three pairs each of opposing slots and windings, with three pairs of corresponding stator teeth 604 corresponding to three-phases of power. The developed winding diagram 1402 corresponds to a single phase, which will be referred to as phase-A. The phase-A winding has two coils, referenced as A1 and A2. These two coils are connected in series. The developed winding diagram 1402 illustrates the sinusoidal rotor flux and the corresponding angular positioning of the coils of the stator windings 610 associated with coils A1 and A2 at the depicted positioning of the rotor 102 in FIG. 14A.

To illustrate a process for determining the electromagnetic torque potential for the actuator motor 100 according to one embodiment, the sample calculations will be compared for an actuator motor 100 having six stator slots 602 and twelve stator slots 602. For the actuator motor having six stator slots 602, as shown in FIGS. 14A and 14B, a sample torque calculation is as follows:

The mechanical angle along rotor periphery=$\theta$

The rotor flux distribution in the air-gap: $B(\theta)=B_m \cos(\theta)$

Number of coils per phase=$n_c$=2

Total ampere-turn in each phase=NI

Active length of the machine=$L_{a6}$

Inner radius of the stator=$R_s$

Due to the symmetry of the locations, the flux linkages the two coils (A1 and A2) are equal. The flux linkage is coil A1, $\phi_1$ and the flux linkage in coil A2, $\phi_2$, can be represented as:

$$\phi_1 = \phi_2 = L_a R_s \int_{-\pi/6}^{\pi/6} B_m \cdot \cos(2\theta) d\theta$$

Therefore the total flux linkage in phase-A of the 4-pole 6-slot actuator motor 100 can be found as:

$$\phi_{a6}=\phi_1+\phi_2=\sqrt{3} \cdot B_m L_a R_s$$

Ampere turn in each of the coils=

$$\frac{NI}{n_c} = \frac{NI}{2}$$

In a permanent magnet motor, the electromagnetic torque is proportional to the total flux linkage and the total ampere turn of a coil. Therefore, the electromagnetic torque produced in the 6-slot actuator motor 100 can be presented as:

$$T_{e6} \propto \phi_{a6} \frac{NI}{2} = \frac{\sqrt{3}}{2} B_m L_a R_s NI$$

Figure 15A:
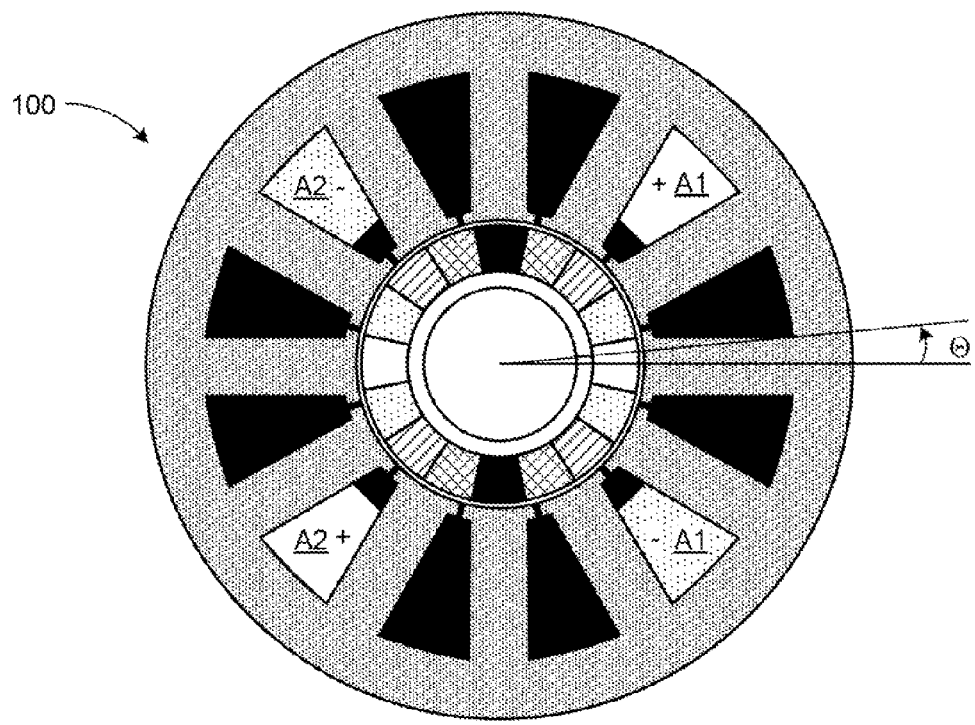
FIGS. 15A and 15B are a cross-sectional view of a high performance actuator motor having twelve stator slots and a corresponding winding diagram, respectively, according to one embodiment presented herein.
Figure 15B:
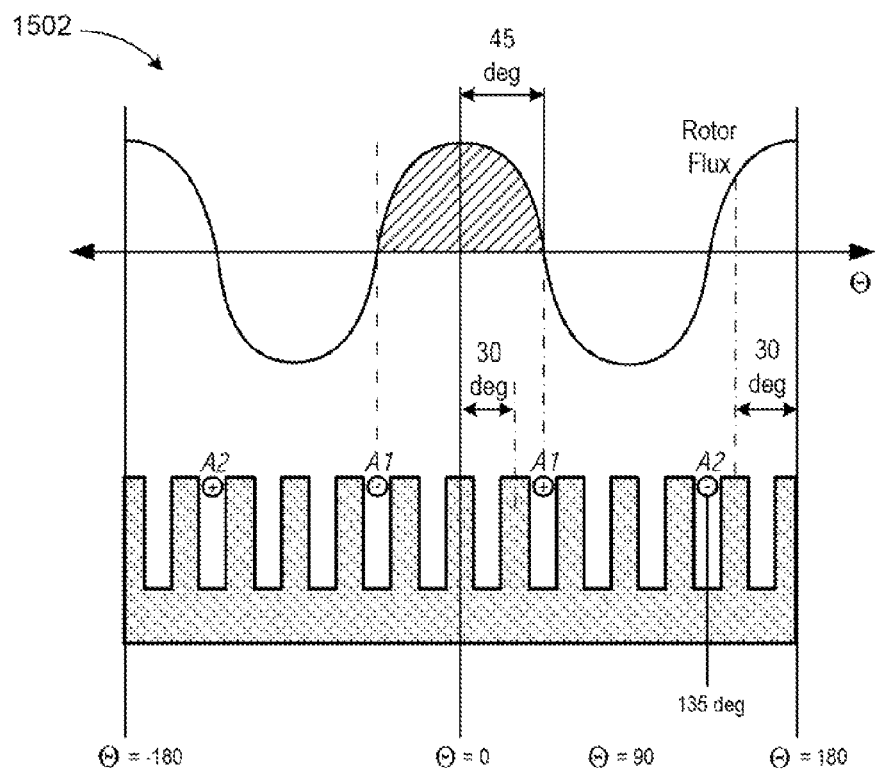

FIGS. 15A and 15B show a simplified cross-sectional view of an actuator motor 100 having twelve stator slots 602 is shown, along with a corresponding developed winding diagram 1502, respectively. As with the 6-slot motor shown and described above, FIGS. 15A and 15B depict the phase-A winding distribution and corresponding rotor flux linkage and developed winding diagram for the phase. This winding configuration also has two coils (A1 and A2), which are connected in series. Due to symmetry of their locations, the flux linkages of in the two coils are equal. It can be seen that as the rotor 102 has four poles, each coil in the stator winding 610 covers the entire pole pitch. For the actuator motor having twelve stator slots 602, as shown in FIGS. 15A and 15B, a sample torque calculation is as follows:

Number of coils per phase=$n_c$=2
Total ampere-turn in each phase=NI
Active length of the machine=$L_{a12}$
The flux linkage is coil A1, $\phi_1$ and the flux linkage in coil A2, $\phi_2$, can be found as:

$$\phi_1 = \phi_2 = L_{a12} R_s \int_{-\pi}^{\pi} B_m \cdot \cos(2\theta) \, d\theta$$

The total flux linkage in the phase-A of the 4-pole, 12-slot machine is:

$$\phi_{a12} = \phi_1 + \phi_2 = 2 \cdot B_m L_{a12} R_s$$

Ampere turn in each of the coils=

$$\frac{NI}{n_c} = \frac{NI}{2}$$

The electromagnetic torque produced in the twelve slot actuator motor 100 can be presented as:

$$T_{e12} \propto \phi_{a12} \frac{NI}{2} = B_m L_{a12} R_s NI$$

From comparing the torque equations for the six and twelve slot actuator motors 100, it can be seen that for the same rotor structure with equal active length ampere-turns, the electromagnetic torque produced in the 12-slot actuator motor 100 is $2/\sqrt{3}$=1.15 times higher in the electromagnetic torque produced in the 6-slot actuator motor 100. However, according to various embodiments, the maximum length of the actuator motor 100 may be constrained depending on the particular application. For illustrative purposes, assume that one embodiment constrains the total length of the actuator motor 100 to 95.5 mm. A part of this maximum length will be occupied by the end windings 902. Therefore, the active length of the motor should be calculated with the end winding considerations. It can be seen that the coils in the 6-slot actuator motors 100 are concentrated type; therefore, the coils of different phases in the machine do not overlap each other. But the coils in the 12-slot actuator motor 100 are not concentrated type and the coils of the different phases overlap each other. Therefore, the end windings 902 in the 12-slot actuator motor 100 will require more space to accommodate them.

Continuing the illustrative example, it can be found from the design of the stator slot 602 area and the end windings 902, that the active length of the 6-slot actuator motor 100 is $L_{a6}$=76 mm, and the active length of the 12-slot actuator motor 100 is $L_{a12}$=62 mm. Therefore, using the torque equations from the six and 12-slot actuator motors 100 above, the electromagnetic torque produced in the two machines can be compared as:

$$\frac{T_{e6}}{T_{e12}} = \frac{\sqrt{3}}{2} \frac{B_m L_{a6} R_s NI}{B_m L_{a12} R_s NI} = \frac{\sqrt{3}}{2} \frac{L_{a6}}{L_{a12}} = \frac{\sqrt{3}}{2} \frac{76}{62} = 1.06$$

Therefore, it can be seen although for equal active length, the 12-slot actuator motor 100 produces more torque than the 6-slot actuator motor 100, but due to the constraint of the length, in this embodiment, the 6-slot actuator motor 100 produces slightly higher torque. Furthermore, the longer end winding 902 will cause additional copper losses without contributing to the production of the electromagnetic torque. Also, it can be noted that the 6-slot winding distribution is a concentrated type, so they may be easier to implement and more reliable than the 12-slot winding distribution. Based on this analysis, according to one embodiment in which the total length of the actuator motor 100 is constrained, the 6-slot stator structure is chosen to design the dual actuator motor 100. However, it should be appreciated that other applications may result in a different result, namely the utilization of more than six stator slots 602.

Figure 16A:
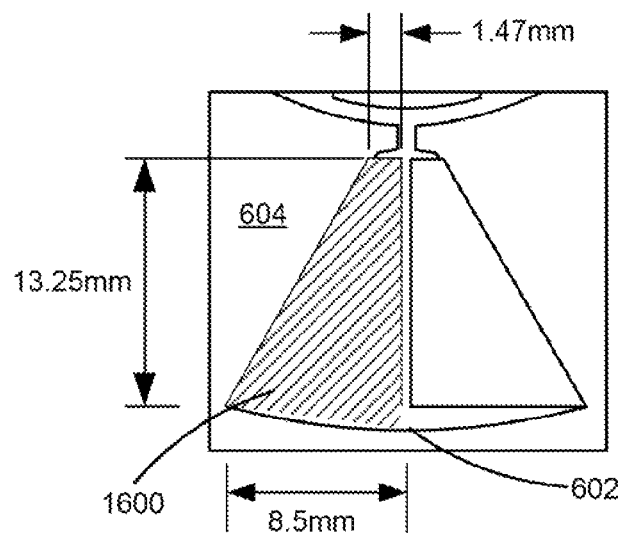
FIGS. 16A-16C are partial cross-sectional views of a stator slot and corresponding winding according to various embodiments presented herein.
Figure 16B:
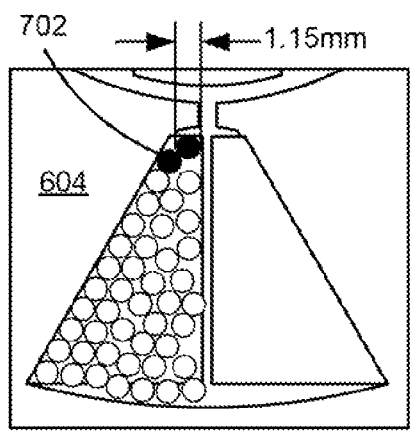
Figure 16C:
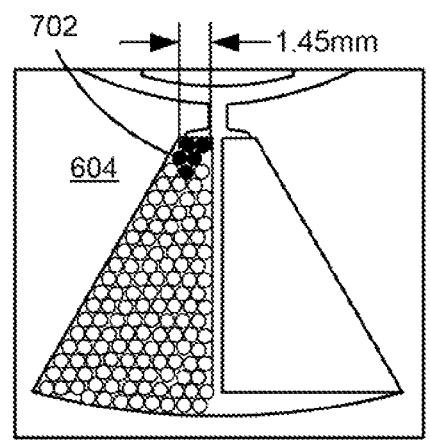

Turning now to FIGS. 16A-16C, the configuration of the stator windings 610 will be discussed according to one embodiment. FIG. 16A shows various dimensions of one implementation of a stator slot 602.

According to one embodiment, which merely illustrates one partial set of any number of potential design parameters of an actuator motor 100 are as follows:

| Parameters | Values |
|---|---|
| Minimum motor acceleration large amplitude, Single motor | 105640 rad/sec$^2$ |
| Minimum motor acceleration large amplitude, Dual motor | 130420 rad/sec$^2$ |
| Continuous zero speed torque, Single motor | 20.2 in-lbf (2.3 N.m) |
| Minimum torque @ Zero Speed, Single motor | 87.9 in-lbf (9.9 N.m) |
| Maximum @ Zero Speed, Single motor | 135.8 in-lbf (15.3 N.m) |
| Minimum Motor Speed | 14542 rpm |

Using these parameters, as well as physics-based algorithms and finite element analysis (FEA), the stator slot area and corresponding stator winding 610 characteristics are designed. The peak torque produced by the actuator motor 100 is determined to be 10.08 N-m, with the continuous zero speed torque being 2.3 N-m.

Because the thermal limit of the actuator motor 100 is substantially controlled by the continuous zero speed torque ($T_{czs}$=2.3 N·m) and the magnetic limit of the actuator motor 100 is controlled by the peak torque requirement ($T_{max}$=10.08 N·m), both the thermal and the magnetic limits are considered while designing the slot area of the motor. As previously stated, according to various embodiments, the slot area of the actuator motor 100 is designed using both known physics-based and FEA analysis given the design parameters of the motor. The width of the stator teeth 604 is chosen such that the stator iron reaches saturation while producing the peak torque. The copper area 1600 of the stator windings 610, which is shown as being hatched in FIG. 16A, is chosen such that it yields the least ohmic loss.

To produce the required constant zero speed torque, the stator windings 610 of the 6-slot motor are excited with balanced sinusoidal current. The peak amplitude of the sinusoidal current excitation is 850 Amp-turn. The average output torque is 2.3 N-m and the torque ripple approximately 3%. The calculated current density in the stator windings to produce this torque is approximately 6.03 A/mm$^2$. For verification of the peak torque production capability, the actuator motor 100 is excited with much higher balanced sinusoidal currents and FEA simulation results show that a sinusoidal excitation with 4590 Amp-turn peak can produce the required maximum torque. Under this condition, the average output torque of the machine is 10.1 N-m. Therefore, the actuator motor 100 is capable of producing the desired high torque to meet the high dynamic performance specifications. It should be appreciated that the disclosure provided herein is not limited to excitation with a sinusoidal current. Rather, other current waveforms may be used without departing from the scope of this disclosure.

The various dimensions of a stator slot 602 of the actuator motor 100 is shown in FIG. 16A. The copper area 1600 available in a slot of the actuator motor 100 can be obtained from these dimensions. As seen, the copper area 1600 is substantially triangular in shape, with the stator slot 602 becoming wider along a radial axis from the innermost edge of the stator tooth 604 to the outermost edge of the stator tooth 604. It should be understood that the precise type of conductor 702 used to realize the stator windings 610 may depend on the particular implementation, based in part on the desired copper area 1600, the dimensions of the stator slots 602, and other performance specifications. Other considerations according to the specific implementation of the motor and windings include, but are not limited to, ampere-turn requirements, copper loss (skin effect and ohmic loss), and packing density such that both winding and loss parameters satisfy any given mechanical and geometric constraints.

For illustrative purposes, FIGS. 16B and 16C show two types of standard copper gauges that can be used to realize the stator windings 610 given the various dimensions and specifications provided above. As with all of the specific implementation details provided herein, the embodiments shown in FIGS. 16B and 16C are merely examples. Depending on the particular implementation, any suitable wire gauge for the conductors 702 may be used.

According to the embodiment shown in FIG. 16B, two parallel strands of 17 American Wire Gauge (AWG) copper wire can be used. As shown, the width of two strands is approximately 1.15 mm, which fits within the 1.47 mm width of the entry to the stator slot 602 at the innermost edge of the stator tooth 604. With two parallel strands of 17 AWG copper wire used, a sufficient winding density can be realized to create the desired stator winding 610 characteristics. As shown, due to the substantially triangular shape of the stator slots 602, the parallel strands of conductors 702 are wrapped around a stator tooth 604 in a manner in which the packing density of parallel strands of conductors 702 increases along a radial axis from the innermost edge of the stator tooth 604 to the outermost edge of the stator tooth 604. Similarly, in the other embodiment shown in FIG. 16C for comparison purposes, 21 AWG copper wire with five parallel conductor strands can be used to realize the stator winding 610. The direct current resistances of both the windings are substantially similar. However, it should be noted that, due to stranding, any skin-effect problem will be less severe in the case of 21 AWG copper based stator winding.

Figure 17:
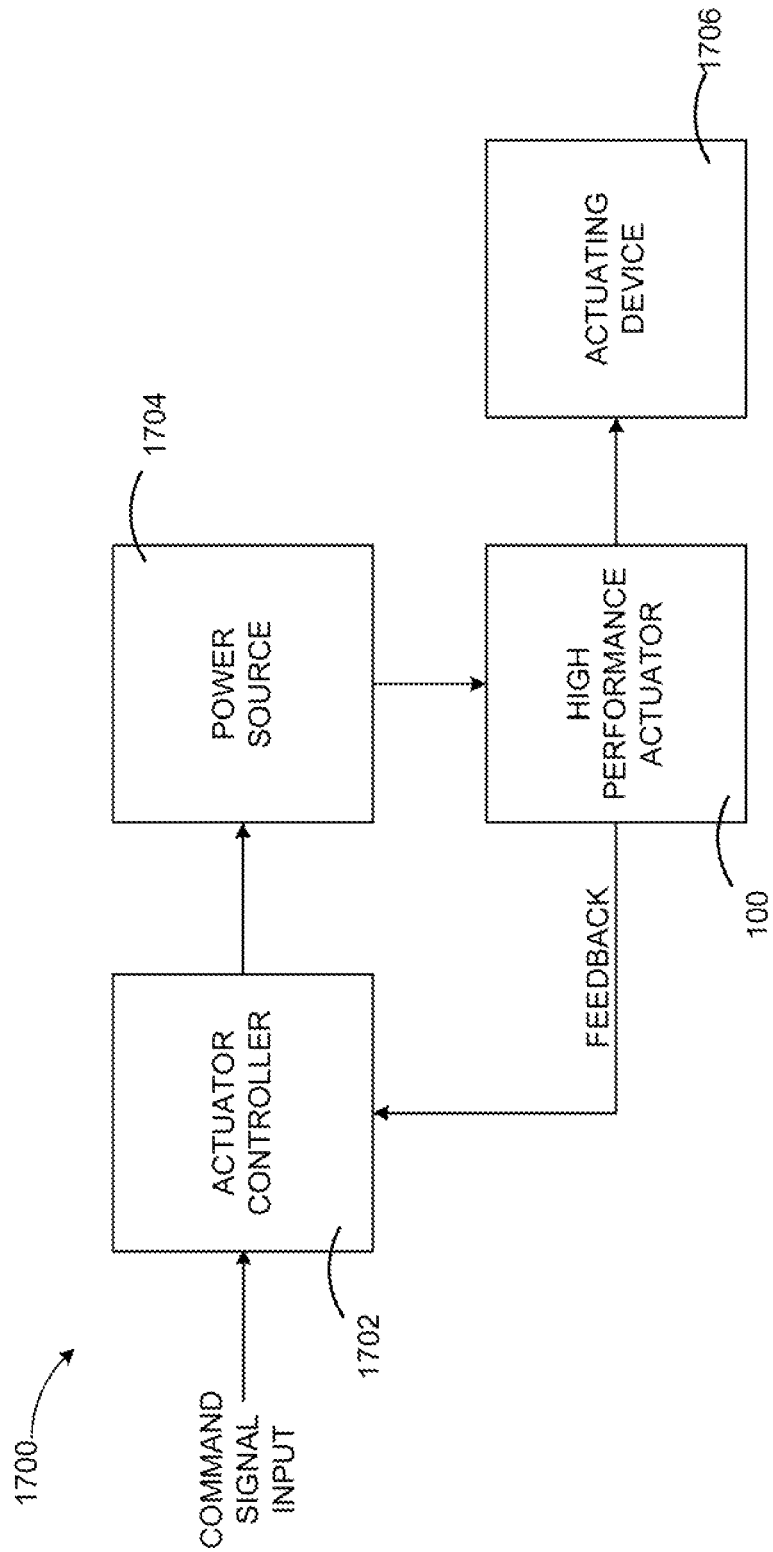
FIG. 17 is a block diagram showing components of high performance actuator motor system according to various embodiments presented herein.

Turning now to FIG. 17, a high performance actuator motor system 1700 will be described. According to various embodiments, the actuator motor system 1700 includes an actuator controller 1702, a power source 1704, the actuator motor 100, and an actuating device 1706. The actuating device 1706 may be any device or load that is acted upon or driven by the actuator motor 100.

According to one embodiment, the actuating device 1706 is a flight control surface of an aircraft. For example, the actuator motor 100 may be attached to an aircraft aileron, rudder, elevator, spoiler, vent/door, or any other movable aircraft surface. While the actuator motor 100 is equally suitable for use with any land or water based vehicle or fixed structure, the motor is particularly useful in the aerospace industry due to the high performance characteristics of the motor coupled with its low weight and footprint.

In the dual-motor based actuator system, the two identical motors 101 are connected mechanically in series to drive the actuating device 1706. According to one embodiment, the dual actuator motor 100 and the actuating device 1706 are coupled by gearing and a ball-screw arrangement. The actuator motor 100 is connected to a power source 1704 that provides the 3-phase power to drive the actuator motor 100 at the designed frequency. The actuator controller 1702 may be any computer hardware and/or software system that is capable of controlling the activation and deactivation of electrical input to the actuator motor 100 via the power source 1704. According to various embodiments, the actuator controller 1702 may monitor the performance of the actuator motor 100, such as via the rotary position angle sensor 904 described above, and provide controlling input into the system accordingly.

The actuator controller 1702 may be communicatively linked to a separate computer system or component (not shown), such as a flight control system or cockpit instrument. In doing so, the pilot or other operator may provide manual input to the actuator motor system 1700 to activate and deactivate the actuator motor 100 to operate the actuating device 1706. Alternatively, the actuator controller 1702 may be pre-programmed with computer-executable instructions to operate the actuator motor 100 according to any type and number of predetermined flight conditions or other aircraft system or environmental events.

Figure 18:
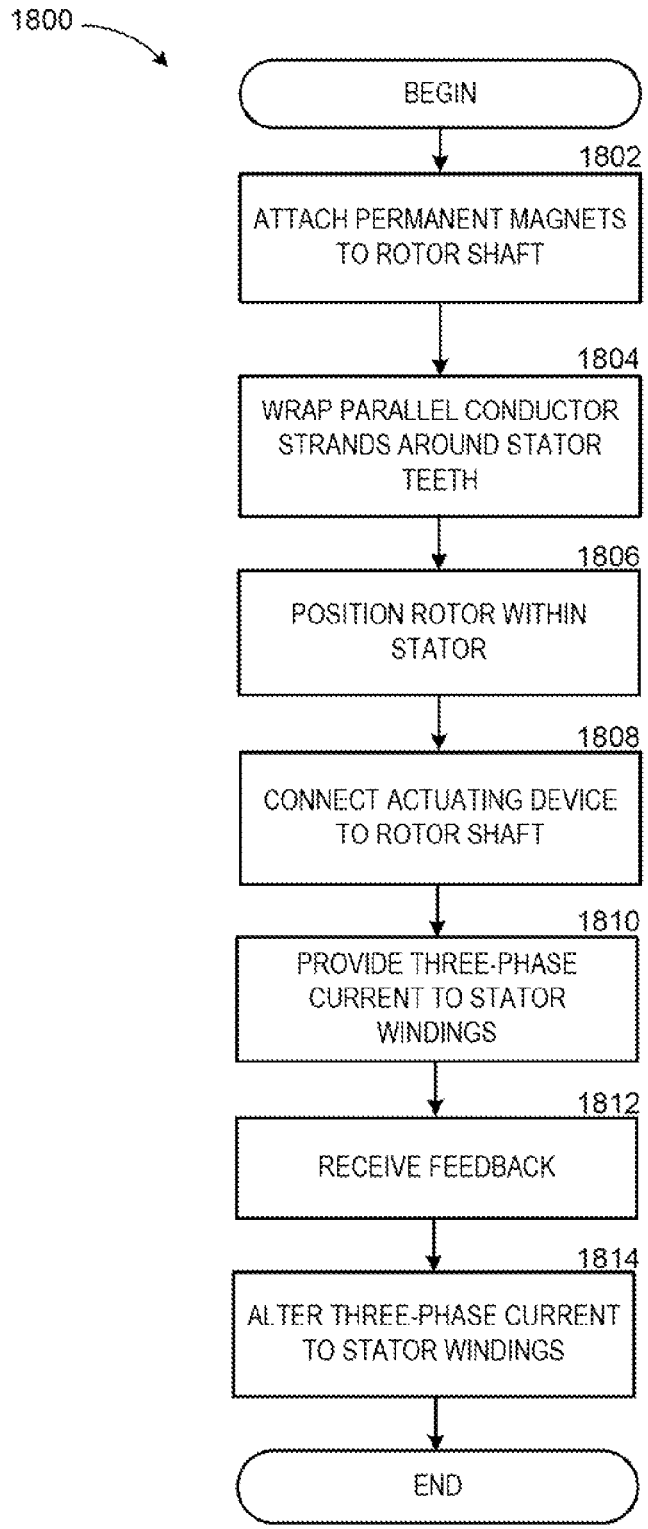
FIG. 18 is a flow diagram illustrating a method for driving an actuating device according to various embodiments presented herein.

Turning to FIG. 18, an illustrative routine 1800 for driving an actuating device will now be described in detail. The term "driving" is used generically to describe the action of creating movement with respect to the actuating device. The movement may include angular or linear translation of a surface or structure. For example, driving an actuating device may include rotating the structure as well as extending or retracting the structure. It should be appreciated that more or fewer operations may be performed than shown in FIG. 18 and described herein. Moreover, these operations may also be performed in a different order than those described herein.

The routine 1800 begins at operation 1802, where the permanent magnets 302 are attached to the rotor shaft 106 according to the Halbach array configuration 420. It should be appreciated that this operation, as well as the other operations described with respect to the routine 1800 occurs after the design specifications and parameters of the actuator motor 100 have been determined in the manner described above.

Attaching the permanent magnets 302 to the rotor shaft 106 may occur utilizing hot shrinking techniques to secure a retaining sleeve 1200 around the permanent magnets 302. The routine 1800 continues to operation 1804, where the stator windings 610 are created. The stator windings 610 are created by wrapping the conductors 702 around the stator teeth 604 to create the coils and connecting the coils in series where appropriate for each power phase.

The routine 1800 continues from operation 1804 to operation 1806, where the rotor 102 is positioned within the stator 104 such that the permanent magnets 302 are a gap width 1304 from the stator teeth 604 and corresponding stator windings 610. At operation 1808, the flight control surface or other actuating device 1706 is mechanically connected to the rotor shaft 106. This may occur via gearing and ball screws, for example, or any other appropriate linkage mechanism that will translate the rotational movement of the rotor shaft to the desired movement of the activating device 1706.

The operation 1800 continues from operation 1808 to operation 1810, where the actuator controller 1702 initiates the supply of three-phase current from the power source 1704 to the actuator motor 100. At operation 1812, the actuator controller 1702 may receive feedback from the actuator motor 100 that determines the action that should be taken next. For example, the excitation current in the actuator motor 100 is altered to stop or reverse the actuator motor 100 when a certain angular position has been achieved, as indicated by the rotary position angle sensor 904 as described above. The feedback may additionally include speed or acceleration of the actuator motor 100, or any other applicable operating parameter. After altering the current being supplied to the actuator motor 100 at operation 1814 according to the received feedback, the routine 1800 ends.

It should be clear from the above disclosure that the concepts and technologies described herein provide for a high performance actuator motor that has the capability to produce very high acceleration, has a high torque density to produce a large amount torque under zero speed condition, can operate in temperatures near 80 degrees C. while cooled naturally. In other words, the actuator motor 100 described above has very fast dynamic response capability, high torque density, high efficiency, and good thermal and mechanical stability at high speed. Under dual motor operations, the acceleration of the dual actuator motor 100 is approximately 130,420 rad/sec$^2$ according to one embodiment. During single motor operation, the acceleration of the motor 101 is approximately 105,640 rad/sec$^2$ according to one embodiment. In this embodiment, a single motor 101 is able to drive the entire high performance actuator motor system 1700. The actuator motor 100 described herein may operate at speeds of approximately 14,542 rev/min.

To accomplish these performance characteristics and improvements, embodiments utilize a Halbach array configuration 420 for the permanent magnets 302 of the rotors 102 within the dual motors 101. The Halbach array based topology allows the designer to realize the actuator motor 100 with a hollow rotor structure, which provides low rotational inertia. With low inertia of the rotor 102, high dynamic performance can be obtained. It should be appreciated that according to the embodiments discussed above, the rotor 102 example dimensions are calculated based on the physics-based algorithms and the specified design constraints of the actuator motor 100. These calculated rotor dimensions may be verified and finalized using finite element analysis techniques. To design the stator structure of the actuator motor 100, different stator winding 610 configurations may be considered according to the particular implementation. In doing so, analyses may be carried out to obtain the torque production capability of the winding configurations while considering the effect of their end windings 902. A 6-slot stator 104 with 4-pole rotor structure is used as the primary example above for the actuator motor 100 design.

According to embodiments described above, the selected winding configuration allows for the use of a concentrated winding with fractional pole pitch and short end connections. The winding distribution can obtain low copper losses and low torque ripple while producing the desired output torque. The stator teeth 604 are designed to provide the actuator motor 100 with a high peak torque production capability. The stator slot area is designed appropriately for housing the copper conductors such that the actuator motor 100 can deliver the continuous torque while operating within the thermal limit. To operate the machine at the required high speed, the surface mounted permanent magnets 302 are secured with retaining sleeves 1200.

The actuator motor 100 described above is estimated to have a rotational moment of inertia that is substantially less than that of a conventional motor design, for example, approximately one fifth of that from a conventional motor design according to one implementation. Translating this into power input and assuming that the acceleration requirement and the rotational speed are equivalent for the conventional motor and the actuator motor 100 described above, the input power at any instant during the course of acceleration of the actuator motor 100 is only approximately one fifth of that from the conventional motor to complete the operation (i.e., deploy or deflect a flight control surface). Looking at this from another perspective, to meet the acceleration requirement, the actuator motor 100 can complete the operation with 80% less power input compared to the existing technology. This power savings significantly reduces the power extraction from the aircraft system. Moreover, the hollowed rotor shaft design and minimal back iron offer significant weight savings and improved thermal management, which correlates to significantly less mass and less heat generation on the aircraft or other implementation platform.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An actuator motor, comprising:
   a rotor comprising a rotor shaft and a plurality of contiguous magnets attached to a circumference of the rotor shaft and configured according to an optimized array that produces a plurality of rotor magnetic fields having augmented flux densities exterior to the rotor and diminished flux densities within an interior of the rotor; and
   a stator comprising
      a stator core aperture sized for receiving the rotor,
      a plurality of stator windings configured to create one or more stator magnetic fields that when introduced to the plurality of rotor magnetic fields, induces a torque on the rotor shaft, and
      a plurality of opposing stator teeth pairs, each of the opposing stator teeth pairs comprising a first stator tooth having a first winding to create a first coil, and a second stator tooth positioned on an opposite side of the stator core aperture from the first stator tooth and having a second winding to create a second coil, wherein the first coil and the second coil are electrically connected in series, and wherein the plurality of opposing stator teeth pairs correspond with separate phases of electrical current.

2. The actuator motor of claim 1, wherein the optimized array that produces a plurality of rotor magnetic fields comprises a Halbach array.

3. The actuator motor of claim 2, wherein the plurality of contiguous magnets comprises 16 permanent magnets arranged in a Halbach array configuration.

4. The actuator motor of claim 3, wherein the plurality of contiguous magnets are configured to provide the plurality of rotor magnetic fields at an operating temperature of greater than approximately 170 degrees Celsius (C).

5. The actuator motor of claim 4, wherein the plurality of contiguous magnets comprise Samarium-Cobalt (SmCo) magnets.

6. The actuator motor of claim 3, wherein the plurality of rotor magnetic fields comprises four flux field distributions corresponding to four magnetic poles.

7. The actuator motor of claim 1, wherein the rotor shaft comprises a hollowed core configured to provide decreased rotational inertia as compared to a corresponding solid rotor shaft.

8. The actuator motor of claim 1, wherein the rotor and the stator are configured such that the actuator motor comprises a fractional pole pitch.

9. The actuator motor of claim 8, wherein the rotor comprises four magnetic poles, and wherein the stator comprises six stator windings.

10. The actuator motor of claim 8, wherein the rotor comprises four magnetic poles, and wherein the stator comprises twelve stator windings.

11. The actuator motor of claim 1, wherein the plurality of stator windings each comprise a plurality of parallel strands of conductors wrapped around a stator tooth such that a packing density of parallel strands increases along a radial axis from an innermost edge of the stator tooth to an outermost edge of the stator tooth.

12. The actuator motor of claim 11, wherein the plurality of parallel strands of conductors comprises two parallel strands of 17 American Wire Gauge (AWG) copper wire.

13. The actuator motor of claim 11, wherein the plurality of parallel strands of conductors comprises five parallel strands of 21 AWG copper wire.

14. The actuator motor of claim 1, wherein the rotor further comprises a retaining sleeve encompassing the plurality of contiguous magnets, the retaining sleeve configured to secure the plurality of contiguous magnets in position on the rotor shaft.

15. The actuator motor of claim 14, wherein the retaining sleeve comprises a titanium material.

16. The actuator motor of claim 15, wherein an outer diameter of the retaining sleeve is undersized with respect to an outer diameter of the rotor.

17. The actuator motor of claim 1, further comprising:
a second rotor adjacent to and spaced apart from the rotor, the second rotor comprising the rotor shaft and a second plurality of contiguous magnets attached to the circumference of the rotor shaft and configured according to the optimized array to create a second plurality of rotor magnetic fields; and
a second stator comprising a second stator core aperture sized for receiving the second rotor, the second stator comprising a second plurality of stator windings configured to create one or more second stator magnetic fields that when introduced to the second plurality of rotor magnetic fields, increases the torque induced on the rotor shaft.

18. The actuator motor of claim 17, wherein the rotor and the second rotor, and the stator and the second stator, are configured to jointly produce an acceleration of the rotor shaft of approximately 130420 rad/sec$^2$.

19. The actuator motor of claim 18, wherein each of the rotor and the stator, and the second rotor and the second stator, is configured to individually produce an acceleration of the rotor shaft of approximately 105640 rad/sec$^2$.

20. The actuator motor of claim 17, wherein the rotor and the stator define a first motor, wherein the second rotor and the second stator define a second motor, and wherein the first motor and the second motor are operative to independently drive an actuating device and to collectively drive the actuating device.

21. The actuator motor of claim 17, wherein the stator windings and the second stator windings are electrically connected to a three-phase power source such that the stator magnetic fields and the second stator magnetic fields rotate around the rotor and the second rotor, wherein the rotor shaft is mechanically connected to an actuating device such that rotation of the rotor shaft drives the actuating device.

22. The actuator motor of claim 21, wherein the actuating device comprises an aircraft flight control surface.

23. A high performance actuator motor system, comprising:
a power source;
an actuator controller communicatively linked to the power source and operative to control an electrical input from the power source to an actuator motor;
an actuating device; and
the actuator motor, comprising:
a first rotor comprising a rotor shaft and a first plurality of contiguous magnets attached to a circumference of the rotor shaft and configured according to an optimized array that produces a first plurality of rotor magnetic fields having augmented flux densities exterior to the first rotor and diminished flux densities within an interior of the first rotor, wherein the rotor shaft is mechanically connected to the actuating device such that rotation of the rotor shaft drives the actuating device,
a first stator comprising a stator core aperture sized for receiving the rotor, the stator comprising a plurality of stator windings configured to create one or more stator magnetic fields upon receipt of the electrical input from the power source such that when the one or more stator magnetic fields are introduced to the plurality of rotor magnetic fields, a torque is induced on the rotor shaft to drive the actuating device,
a second rotor identical to the first rotor with a second plurality of contiguous magnets attached to the rotor shaft adjacent to the first plurality of contiguous magnets, and
a second stator identical to the first stator and encompassing the second rotor,
wherein the first rotor and the first stator define a first motor, wherein the second rotor and the second stator define a second motor, and wherein the first motor and the second motor are operative to independently drive the actuating device and to collectively drive the actuating device.

24. The high performance actuator motor system of claim 23, wherein the optimized array that produces a plurality of rotor magnetic fields comprises a Halbach array, and wherein the first plurality of contiguous magnets and the second plurality of contiguous magnets each comprises 16 permanent magnets.

25. The high performance actuator motor system of claim 24, wherein each of the first plurality of contiguous magnets and second plurality of contiguous magnets comprise SmCo magnets that are configured to provide the plurality of rotor magnetic fields at an operating temperature of greater than approximately 170 degrees C.

26. The high performance actuator motor system of claim 23, wherein the rotor shaft comprises a hollowed core configured to provide decreased rotational inertia as compared to a corresponding solid rotor shaft.

27. The actuator motor of claim 23, wherein the actuator motor is configured with a fractional pole pitch.

28. The actuator motor of claim 27, wherein the first rotor and the second rotor each comprise four magnetic poles, and wherein the first stator and the second stator each comprise six stator windings.

29. The actuator motor of claim 27, wherein the first rotor and the second rotor each comprise four magnetic poles, and wherein the first stator and the second stator each comprise twelve stator windings.

30. The actuator motor of claim 23, wherein the first stator and the second stator each comprise a plurality of opposing stator teeth pairs, each of the opposing stator teeth pairs comprising a first stator tooth having a first winding to create a first coil, and a second stator tooth positioned on an opposite side of the stator core aperture from the first stator tooth and having a second winding to create a second coil, wherein the first coil and the second coil are electrically connected in series, and wherein the plurality of opposing stator teeth pairs correspond with separate phases of electrical current.

31. The actuator motor of claim 23, wherein the first rotor and the second rotor each comprise a retaining sleeve encompassing the plurality of contiguous magnets, the retaining sleeve configured to secure the plurality of contiguous magnets in position on the rotor shaft.

32. A method of driving an actuating device, the method comprising:
attaching a plurality of contiguous magnets to an outer surface of a hollow rotor shaft according to an optimized array that produces a plurality of rotor magnetic fields having augmented flux densities exterior to the rotor shaft and diminished flux densities within an interior of the rotor shaft;
wrapping a plurality of parallel conductor strands around a plurality of stator teeth of a stator to create three pairs of stator windings configured to alternately receive three phases of electrical current;
positioning the rotor shaft with the plurality of contiguous magnets within the stator such that the plurality of contiguous magnets are a gap width from the plurality of stator teeth in a center of the three pairs of stator windings;
mechanically connecting the actuating device to the rotor shaft; and
providing three-phase current input to the three pairs of stator windings such that a rotating stator magnetic field is created that attracts the plurality of rotor magnetic fields and creates a torque on the rotor shaft to drive the actuating device.

33. The method of claim 32, wherein attaching a plurality of contiguous magnets to an outer surface of a hollow rotor shaft comprises utilizing hot shrinking techniques to secure an undersized retaining sleeve around the plurality of contiguous magnets.

34. The method of claim 32, further comprising connecting a rotary position angle sensor to the rotor shaft, the rotary position angle sensor operative to provide angular positioning information as feedback to an actuator controller.

35. The method of claim 34, further comprising receiving the feedback from the rotary position angle sensor and altering the three-phase current in response.

36. The method of claim 32, wherein attaching the plurality of contiguous magnets to the outer surface of the hollow rotor shaft comprises attaching a first plurality of contiguous magnets to the outer surface of the hollow rotor shaft to create a first rotor and attaching a second plurality of contiguous magnets to the outer surface of the hollow rotor shaft to create a second rotor,
wherein wrapping the plurality of parallel conductor strands around the plurality of stator teeth of the stator to create three pairs of stator windings comprises wrapping a first plurality of parallel conductor strands around a first plurality of stator teeth of a first stator to create a first three pairs of stator windings and wrapping a second plurality of parallel conductor strands around a second plurality of stator teeth of a second stator to create a second three pairs of stator windings, and
wherein positioning the rotor shaft with the plurality of contiguous magnets within the stator such that the plurality of contiguous magnets are the gap width from the plurality of stator teeth in the center of the three pairs of stator windings comprises positioning the rotor shaft with the first rotor the gap width from the first plurality of stator teeth of the first stator and the second rotor the gap width from the second plurality of stator teeth of the second stator.

37. The method of claim 36, wherein providing three-phase current input to the three pairs of stator windings such that the rotating stator magnetic field is created that attracts the plurality of rotor magnetic fields and creates the torque on the rotor shaft to drive the actuating device comprises providing the three-phase current input only to the first three pairs of stator windings of the first stator such that the rotating stator magnetic field is created that attracts the plurality of rotor magnetic fields and creates the torque on the rotor shaft to drive the actuating device while the second three pairs of stator windings of the second stator do not receive three-phase current from a power source.

38. An actuator motor, comprising:
a rotor comprising a rotor shaft and a plurality of contiguous magnets attached to a circumference of the rotor shaft and configured according to an optimized array that produces a plurality of rotor magnetic fields having augmented flux densities exterior to the rotor and diminished flux densities within an interior of the rotor; and
a stator comprising a stator core aperture sized for receiving the rotor, the stator comprising a plurality of stator windings configured to create one or more stator magnetic fields that when introduced to the plurality of rotor magnetic fields, induces a torque on the rotor shaft, wherein the plurality of stator windings each comprise a plurality of parallel strands of conductors wrapped around a stator tooth such that a packing density of parallel strands increases along a radial axis from an innermost edge of the stator tooth to an outermost edge of the stator tooth.

39. The actuator motor of claim 38, wherein the plurality of parallel strands of conductors comprises two parallel strands of 17 AWG copper wire.

40. The actuator motor of claim 38, wherein the plurality of parallel strands of conductors comprises five parallel strands of 21 AWG copper wire.

41. An actuator motor, comprising:
- a first rotor comprising a rotor shaft and a first plurality of contiguous magnets attached to a circumference of the rotor shaft and configured according to an optimized array that produces a first plurality of rotor magnetic fields having augmented flux densities exterior to the rotor and diminished flux densities within an interior of the rotor;
- first stator comprising a stator core aperture sized for receiving the rotor, the stator comprising a first plurality of stator windings configured to create one or more first stator magnetic fields that when introduced to the first plurality of rotor magnetic fields, induces a torque on the rotor shaft;
- a second rotor adjacent to and spaced apart from the first rotor, the second rotor comprising the rotor shaft and a second plurality of contiguous magnets attached to the circumference of the rotor shaft and configured according to the optimized array to create a second plurality of rotor magnetic fields; and
- a second stator comprising a second stator core aperture sized for receiving the second rotor, the second stator comprising a second plurality of stator windings configured to create one or more second stator magnetic fields that when introduced to the second plurality of rotor magnetic fields, increases the torque induced on the rotor shaft.

42. The actuator motor of claim 41, wherein the rotor and the second rotor, and the stator and the second stator, are configured to jointly produce an acceleration of the rotor shaft of approximately 130420 rad/sec$^2$.

43. The actuator motor of claim 42, wherein each of the rotor and the stator, and the second rotor and the second stator, is configured to individually produce an acceleration of the rotor shaft of approximately 105640 rad/sec$^2$.

44. The actuator motor of claim 41, wherein the rotor and the stator define a first motor, wherein the second rotor and the second stator define a second motor, and wherein the first motor and the second motor are operative to independently drive an actuating device and to collectively drive the actuating device.

45. The actuator motor of claim 41, wherein the stator windings and the second stator windings are electrically connected to a three-phase power source such that the stator magnetic fields and the second stator magnetic fields rotate around the rotor and the second rotor, wherein the rotor shaft is mechanically connected to an actuating device such that rotation of the rotor shaft drives the actuating device.

46. The actuator motor of claim 45, wherein the actuating device comprises an aircraft flight control surface.

\* \* \* \* \*